United States Patent
Nishioka et al.

(10) Patent No.: US 8,067,075 B2
(45) Date of Patent: Nov. 29, 2011

(54) MULTILAYER TUBE

(75) Inventors: Tomoharu Nishioka, Ube (JP); Koji Nakamura, Ube (JP); Tsuyoshi Iwasa, Ichihara (JP); Atsushi Funaki, Ichihara (JP); Eiichi Nishi, Chiyoda-ku (JP); Koichi Uchida, Ota-ku (JP); Tsugunori Kashimura, Chiyoda-ku (JP); Takashi Yamashita, Tsukuba (JP); Yuji Munesawa, Tsukuba (JP)

(73) Assignees: Ube Industries, Inc. (JP); Asahi Glass Company, Limited (JP); Kuraray Co., Ltd. (JP)

( * ) Notice: Subject to any disclaimer, the term of this patent is extended or adjusted under 35 U.S.C. 154(b) by 43 days.

(21) Appl. No.: 10/587,249

(22) PCT Filed: Jan. 27, 2005

(86) PCT No.: PCT/JP2005/001563
§ 371 (c)(1),
(2), (4) Date: Jul. 26, 2006

(87) PCT Pub. No.: WO2005/071301
PCT Pub. Date: Aug. 4, 2005

(65) Prior Publication Data
US 2007/0148389 A1 Jun. 28, 2007

(30) Foreign Application Priority Data
Jan. 27, 2004 (JP) ................... 2004-018368

(51) Int. Cl.
*B32B 1/08* (2006.01)
*B32B 27/08* (2006.01)
(52) U.S. Cl. ............ 428/36.91; 428/35.7; 428/36.9
(58) Field of Classification Search ............ 428/36.8, 428/36.9, 36.91, 35.7; 138/137; 526/260
See application file for complete search history.

(56) References Cited

U.S. PATENT DOCUMENTS

| | | | | |
|---|---|---|---|---|
| 5,554,425 A | * | 9/1996 | Krause et al. | 428/36.91 |
| 5,670,608 A | * | 9/1997 | Oka et al. | 528/322 |
| 5,750,626 A | | 5/1998 | Shimizu et al. | |
| 5,869,157 A | * | 2/1999 | Stoeppelmann | 428/36.91 |
| 6,656,553 B2 | * | 12/2003 | Nishi et al. | 428/36.91 |
| 6,794,048 B2 | * | 9/2004 | Schmitz et al. | 428/474.7 |
| 2003/0012906 A1 | | 1/2003 | Suzuki | |
| 2003/0050376 A1 | * | 3/2003 | Oka et al. | 524/413 |
| 2004/0077775 A1 | * | 4/2004 | Audenaert et al. | 524/567 |

FOREIGN PATENT DOCUMENTS

EP 1 470 910 A1 10/2004
(Continued)

OTHER PUBLICATIONS

Machine Translation of JP 07173447 (Jul. 1995).*

*Primary Examiner* — Rena Dye
*Assistant Examiner* — Erik Kashnikow
(74) *Attorney, Agent, or Firm* — DLA Piper LLP (US)

(57) ABSTRACT

A multilayer tube including at least three layers including a layer (a) formed of (A) polyamide 11 and/or polyamide 12, a layer (b) formed of (B) a polyamide (semi-aromatic polyamide) including a dicarboxylic acid unit containing a terephthalic acid and/or naphthalenedicarboxylic acid unit in a proportion of 50 mol % or more based on all dicarboxylic acid units, and a diamine unit containing an aliphatic diamine unit having a carbon number of 9 to 13 in a proportion of 60 mol % or more based on all diamine units, and a layer (c) formed of (C) a fluorine-containing polymer having introduced into the molecular chain thereof a functional group having reactivity with a polyamide-based resin, is provided as a multilayer tube excellent in an alcohol gasoline permeation-preventing property, interlayer adhesion, low-temperature impact resistance, heat resistance and chemical resistance.

16 Claims, 3 Drawing Sheets

FOREIGN PATENT DOCUMENTS

| | | |
|---|---|---|
| JP | 5-245988 A | 9/1993 |
| JP | 5-247478 A | 9/1993 |
| JP | 6-234190 A | 8/1994 |
| JP | 7-96564 A | 4/1995 |
| JP | 07173447 A * | 7/1995 |
| JP | 7-507739 T | 8/1995 |
| WO | WO 01/94829 A1 | 12/2001 |

* cited by examiner

US 8,067,075 B2

MULTILAYER TUBE

RELATED APPLICATION

This is a §371 of International Application No. PCT/JP2005/001563, with an international filing date of Jan. 27, 2005 (WO 2005/071301 A1, published Aug. 4, 2005), which is based on Japanese Patent Application No. 2004-018368, filed Jan. 27, 2004.

TECHNICAL FIELD

The present invention relates to a multilayer tube comprising a layer formed of polyamide 11 and/or polyamide 12, a layer formed of a semi-aromatic polyamide having a specific structure, and a layer formed of a fluorine-containing polymer having introduced into the molecular chain thereof a functional group having reactivity with a polyamide-based resin. More specifically, the present invention relates to a multilayer tube excellent in an alcohol gasoline permeation-preventing property, in interlayer adhesion, in low-temperature impact resistance, in heat resistance and in chemical resistance.

BACKGROUND

The main material of a tube for automobile piping is shifting from a metal to a lightweight resin, with an excellent rust-preventing property, so as to overcome an old problem of rusting due to anti-freeze agents on roads or to meet the recent requirement for energy saving which is a pressing issue in view of the prevention of global warming. The resin usually used for the piping tube includes a polyamide-based resin, a saturated polyester-based resin, a polyolefin-based resin, a thermoplastic polyurethane-based resin and the like. However, a single-layer tube using such a resin is insufficient in heat resistance, chemical resistance and the like and, therefore, the applicable range thereof is limited.

In the tube for automobile piping, from the standpoint of reducing gasoline consumption and attaining higher performance, an oxygen-containing gasoline having blended therein alcohols, having low boiling points, such as methanol and ethanol, or ethers such as methyl-tert-butyl ether (MTBE), is transferred. Furthermore, in view of environmental antipollution, strict regulations regarding exhaust gas have been recently implemented, including preventing volatile hydrocarbons or the like from leaking out into air by diffusion through a piping tube walls. The regulations will become more and more strict in the future and it is desired to maximally prevent the fuel from permeating and evaporating through the piping tube walls. Such strict regulations cannot be satisfied by a conventionally-employed single-layer tube using a polyamide-based resin, and particularly polyamide 11 or polyamide 12 excellent in the strength, toughness, chemical resistance and flexibility, because the capability of preventing permeation of the above-described fuel is insufficient. Thus, an improvement is required in the prevention of, particularly, alcohol gasoline permeation.

As for the method to solve this problem, there has been proposed a multilayer tube having disposed therein a resin having good alcohol gasoline permeation-preventing property, such as an ethylene-vinyl acetate copolymer saponification product (EVOH), polymetaxylylene adipamide (polyamide MXD6), polybutylene terephthalate (PBT), polyethylene naphthalate (PEN), polybutylene naphthalate (PBN), polyphenylene sulfide (PPS), polyvinylidene fluoride (PVDF), ethylene/tetrafluoroethylene copolymer (ETFE), ethylene/chlorotrifluoroethylene copolymer (ECTFE), tetrafluoroethylene/hexafluoropropylene copolymer (TFE/HFP, FEP), tetrafluoroethylene/perfluoro(alkyl vinyl ether) copolymer (TFE/PAVE, PFA) and tetrafluoroethylene/hexafluoropropylene/vinylidene fluoride copolymer (TFE/HFP/VDF, THV) (see, for example, Kohyo (National Publication of Translated Version) No. 7-507739).

Furthermore, a fuel transfer tube where a fluorine-based resin is disposed as an inner layer and a layer comprising an ethylene/vinyl acetate copolymer saponification product is disposed outside the inner layer has been proposed (see, Kokai (Japanese Unexamined Patent Publication) No. 5-247478). However, the ethylene/vinyl acetate copolymer saponification product (EVOH) used in this technique is lacking in the thermal stability and when the die temperature, in the merging section, is high during the coextrusion molding with a fluorine-based resin, the polymer may undergo thermal deterioration. In order to prevent this problem, the melting point of the fluorine-based resin may be reduced by controlling the compositional ratio of monomers thereof and rendered close to the processing temperature of the ethylene/vinyl acetate copolymer saponification product, but the alcohol gasoline permeation-preventing property inevitably decreases.

On the other hand, a fuel transfer tube where a fluorine-based resin is disposed as an inner layer and a layer comprising a partial aromatic polyamide resin is disposed outside the inner layer has been proposed (see, Kokai No. 5-245988). However, the polymetaxylylene adipamide (polyamide MXD6) disclosed as the partial aromatic polyamide in Examples of this technique is insufficient in the adhesive strength to polyamide 11 and/or polyamide 12 conventionally employed as a material constituting the tube for automobile piping, and an adhesive layer such as modified polyolefin needs to be provided between those layers. When a modified polyolefin is used as the adhesive layer, this is disadvantageous in that the thermal aging resistance is poor and the tube cannot be used in severe conditions, and fails in maximally bringing out the characteristic properties of the partial aromatic polyamide resin or fluorine-based resin constituting the fuel transfer tube. Also, the increase in the number of layers may incur problems in view of cost and process control.

Furthermore, a fuel transfer tube comprising an innermost layer formed of a fluorine-based resin, an intermediate layer formed of a polyalkylene naphthalate resin and an outer layer formed of a thermoplastic resin or a thermoplastic elastomer, wherein an adhesive layer is disposed between the innermost layer and the intermediate layer, has been proposed (see, Kokai No. 7-96564). The fuel transfer tube of this technique is very excellent in the alcohol gasoline permeation-preventing property. In this fuel transfer tube, an adhesive resin composition comprising at least one member selected from the group consisting of fluorine-based resins and fluorine-based rubbers, at least one member selected from the group consisting of crystalline polyester-based resins and polyester-based elastomers, and a compatibilizing agent is proposed as the adhesive resin interposed between those layers. However, its interlayer adhesion is affected by the morphology of the mixture used as the adhesive resin and this gives rise to a problem that the interlayer adhesion greatly varies or decreases depending on the extrusion conditions, use environment conditions or the like. In particular, the durability of the interlayer adhesive strength during the immersion in fuel (hereinafter referred to as "fuel resistance of interlayer adhesive strength") is poor. Also, in a fuel transfer tube comprising an innermost layer formed of a polyamide-based resin, an intermediate layer formed of a polyalkylene naphthalate resin and an outer layer formed of a thermoplastic resin or a thermoplastic elastomer, wherein an adhesive layer is disposed between the innermost layer and the intermediate layer, it is proposed to dispose, as the adhesive resin interposed between those layers, an adhesive resin mixture comprising at least one member selected from the group consisting of polyamide-based resins and polyamide-based elastomers, at least one member selected from crystalline polyester-based resins and polyester-based elastomers, and a compatibilizing agent. However, for the same reason as given above, there is a problem that the interlayer adhesion greatly varies or decreases depending on the extrusion conditions, use environment conditions or the like. Furthermore, in the case where the innermost layer is a polyamide-based resin, the resistance to sour gasoline, produced by oxidation of gasoline, (chemical resistance) is sometimes poor.

It would therefore be helpful to provide a multilayer tube excellent in an alcohol gasoline permeation-preventing property, interlayer adhesion, low-temperature impact resistance, heat resistance and/or chemical resistance.

SUMMARY

We found that a multilayer tube comprising a layer formed of polyamide 11 and/or polyamide 12, a layer formed of a semi-aromatic polyamide having a specific structure, and a layer formed of a fluorine-containing polymer having introduced into the molecular chain thereof a functional group having reactivity with a polyamide-based resin ensures that both the interlayer adhesion and the alcohol gasoline permeation-preventing property are satisfied and that various properties, such as low-temperature impact resistance, heat resistance and chemical resistance, are excellent.

We provide multilayer tubes comprising at least three or more layers including:
 a layer (a) comprising (A) polyamide 11 and/or polyamide 12,
 a layer (b) comprising (B) a polyamide (semi-aromatic polyamide) comprising a dicarboxylic acid unit containing a terephthalic acid and/or naphthalenedicarboxylic acid unit in a proportion of 50 mol % or more based on all the dicarboxylic acid units, and a diamine unit containing an aliphatic diamine unit having a carbon number of 9 to 13 in a proportion of 60 mol % or more based on all the diamine units, and
 a layer (c) comprising (C) a fluorine-containing polymer having introduced into the molecular chain thereof a functional group having reactivity with a polyamide-based resin.

One aspect relates to a multilayer tube comprising at least four or more layers including:
 a layer (a) comprising (A) polyamide 11 and/or polyamide 12,
 a layer (b) comprising (B) a polyamide (semi-aromatic polyamide) comprising a dicarboxylic acid unit containing a terephthalic acid and/or naphthalenedicarboxylic acid unit in a proportion of 50 mol % or more based on all the dicarboxylic acid units, and a diamine unit containing an aliphatic diamine unit having a carbon number of 9 to 13 in a proportion of 60 mol % or more based on all the diamine units,
 a layer (c) comprising (C) a fluorine-containing polymer having introduced into the molecular chain thereof a functional group having reactivity with a polyamide-based resin, and
 a layer (d) comprising (D) a terminal modified polyamide satisfying [A]>[B]+5, wherein [A] is the terminal amino group concentration (μeq/g-polymer) of the polyamide and [B] is the terminal carboxyl group concentration (μeq/g-polymer) of the polyamide.

The multilayer tube has both interlayer adhesion and an alcohol gasoline permeation-preventing property and satisfies with various properties such as low-temperature impact resistance, heat resistance and chemical resistance. In particular, the permeation and evaporation of alcohol-mixed hydrocarbon through the tube walls can be suppressed to the maximum, and strict environmental regulations can be complied with. Furthermore, reduction in the interlayer adhesion after immersion in fuel, which is seen in a multilayer tube comprising a polyamide-based resin and a polyester-based or polyphenylene sulfide-based resin having excellent alcohol gasoline permeation-preventing property, does not occur, and a high fuel resistance of the interlayer adhesive strength is obtained.

Figure 1:
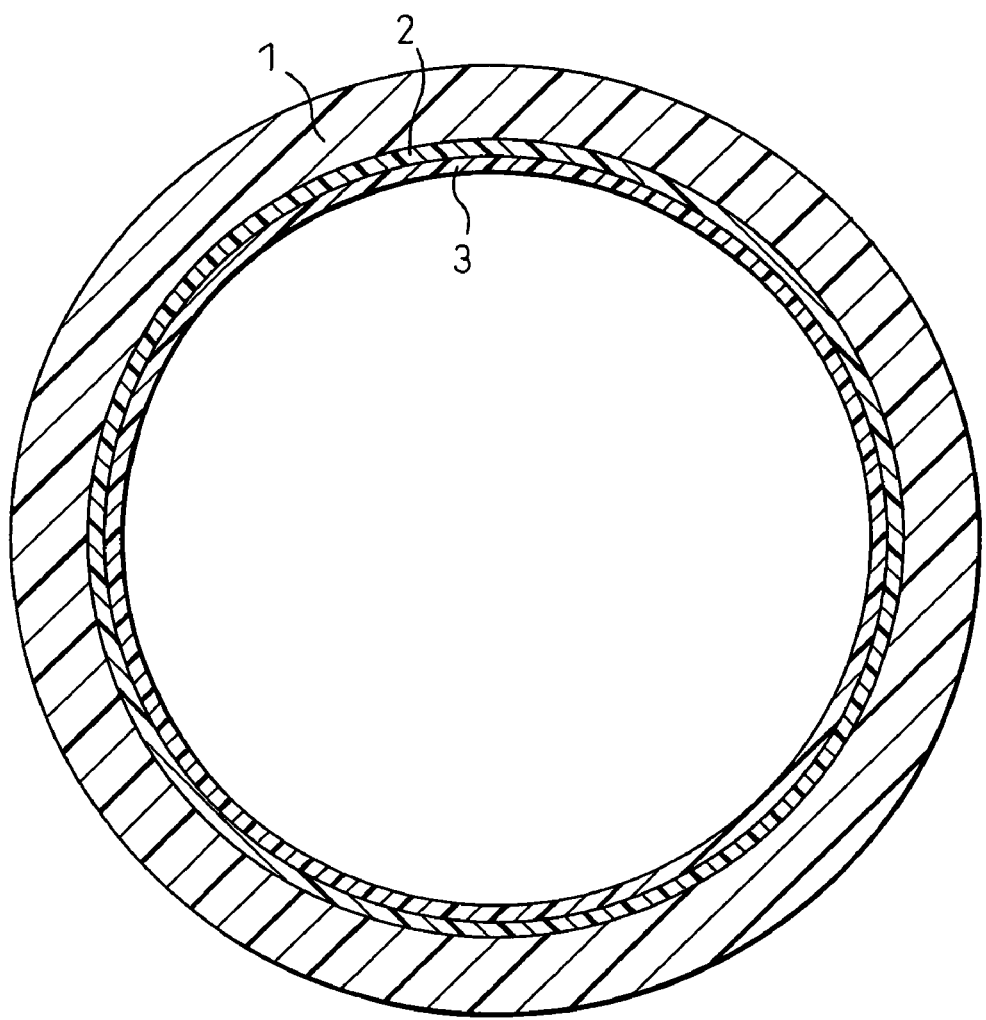
FIG. 1 is a transverse cross-sectional view of an Example of a multilayer tube.

In these Figures, 1 is an outermost layer, that is, a layer (a) comprising (A) polyamide 11 and/or polyamide 12; 2 is an intermediate layer, that is, a layer (b) comprising (B) a semi-aromatic polyamide; 3 is an innermost layer, that is, a layer (c) comprising (C) a fluorine-containing polymer; 4 is an inner layer, that is, a layer (d) comprising (D) a terminal modified polyamide; and 5 is an electrically conducting layer, that is, a layer comprising a fluorine-containing polymer containing an electrically conducting filler.

DETAILED DESCRIPTION

Selected, representative aspects of the invention are described in detail below.

The (A) polyamide 11 is typically a polyamide having an acid amide bond (—CONH—), represented by the formula: (—CO—(CH$_2$)$_{10}$—NH—)$_n$, and can be obtained by polymerizing 11-aminoundecanoic acid or undecanelactam. The polyamide 12 is typically a polyamide having an acid amide bond (—CONH—), represented by the formula: (—CO—(CH$_2$)$_{11}$—NH—)$_n$, and can be obtained by polymerizing 12-aminododecanoic acid or dodecanelactam.

The (A) polyamide 11 and/or polyamide 12 may be a copolymer mainly comprising the above-described monomer (60 wt % or more). Examples of the copolymerization component include a lactam, an aminocarboxylic acid, and a nylon salt comprising a diamine and a dicarboxylic acid.

Examples of the lactam include ε-caprolactam, enantholactam, α-pyrrolidone and α-piperidone. Examples of the aminocarboxylic acid include 6-aminocaproic acid, 7-aminoheptanoic acid and 9-aminononanoic acid. One species or two or more species thereof may be used.

Examples of the diamine constituting the nylon salt include an aliphatic diamine such as ethylenediamine, 1,3-propylenediamine, 1,4-butanediamine, 1,5-pentanediamine, 1,6-hexanediamine, 1,7-heptanediamine, 1,8-octanediamine, 1,9-nonanediamine, 1,10-decanediamine, 1,11-undecanediamine, 1,12-dodecanediamine, 1,13-tridecanediamine, 1,14-tetradecanediamine, 1,15-pentadecanediamine, 1,16-hexadecanediamine, 1,17-heptadecanediamine, 1,18-octadecanediamine, 1,19-nonadecanediamine, 1,20-eicosanediamine, 2/3-methyl-1,5- pentanediamine, 2-methyl-1,8-octanediamine, 2,2,4/2,4,4-trimethyl-1,6-hexanediamine and 5-methyl-1,9-nonanediamine; an alicyclic diamine such as 1,3/1,4-cyclohexanediamine, 1,3/1,4-cyclohexanedimethylamine, bis(4-aminocyclohexyl)methane, bis(4-aminocyclohexyl)propane, bis(3-methyl-4-aminocyclohexyl)methane, bis(3-methyl-4-aminocyclohexyl)propane, 5-amino-2,2,4-trimethyl-1-cyclopentanemethylamine, 5-amino-1,3,3-trimethylcyclohexanemethylamine, bis(aminopropyl)piperazine, bis(aminoethyl)piperazine, norbornanedimethylamine and tricyclodecanedimethylamine; and an aromatic diamine such as p-xylylenediamine and m-xylylenediamine. One species or two or more species thereof may be used.

Examples of the dicarboxylic acid constituting the nylon salt include an aliphatic dicarboxylic acid such as adipic acid, pimelic acid, suberic acid, azelaic acid, sebacic acid, undecanedicarboxylic acid, dodecanedicarboxylic acid, tridecanedicarboxylic acid, tetradecanedicarboxylic acid, pentadecanedicarboxylic acid, hexadecanedicarboxylic acid, octadecanedicarboxylic acid and eicosanedicarboxylic acid; an alicyclic dicarboxylic acid such as 1,3/1,4-cyclohexanedicarboxylic acid, dicyclohexylmethane-4,4'-dicarboxylic acid and norbornanedicarboxylic acid; and an aromatic dicarboxylic acid such as terephthalic acid, isophthalic acid and 1,4/2,6/2,7-naphthalenedicarboxylic acid. One species or two or more species thereof may be used.

Also, the (A) polyamide 11 and/or polyamide 12 may be a homopolymer, a mixture of homopolymers, a mixture with the above-described copolymer, or a mixture with other polyamide-based resins or other thermoplastic resins. In the mixture, the content of the polyamide 11 and/or polyamide 12 is preferably 60 wt % or more, more preferably 80 wt % or more.

Examples of the other polyamide-based resin include polycaproamide (polyamide 6), polyundecanamide (polyamide 11) [excluding polyamide 11 alone], polydodecanamide (polyamide 12) [excluding polyamide 12 alone], polyethylene adipamide (polyamide 26), polytetramethylene adipamide (polyamide 46), polyhexamethylene adipamide (polyamide 66), polyhexamethylene azelamide (polyamide 69), polyhexamethylene sebacamide (polyamide 610), polyhexamethylene undecamide (polyamide 611), polyhexamethylene dodecamide (polyamide 612), polyhexamethylene terephthalamide (polyamide 6T), polyhexamethylene isophthalamide (polyamide 6I), polynonamethylene dodecamide (polyamide 912), polydecamethylene dodecamide (polyamide 1012), polydodecamethylene dodecamide (polyamide 1212), polymetaxylylene adipamide (polyamide MXD6), polybis(4-aminocyclohexyl)methane dodecamide (polyamide PACM12), polybis(3-methyl-4-aminocyclohexyl)methane dodecamide (polyamidedimethyl PACM12), polynonamethylene isophthalamide (polyamide 9I), polynonamethylene hexahydroterephthalamide (polyamide 9T(H)), polydecamethylene isophthalamide (polyamide 10I), polydecamethylene hexahydroterephthalamide (polyamide 10T(H)), polyundecamethylene isophthalamide (polyamide 11I), polyundecamethylene hexahydroterephthalamide (polyamide 11T(H)), polydodecamethylene isophthalamide (polyamide 12I), polydodecamethylene hexahydroterephthalamide (polyamide 12T(H)), and a copolymer using several kinds of raw material monomers of these polyamides. One species or two or more species thereof may be used.

Examples of the other thermoplastic resin include a polyolefin-based resin such as high-density polyethylene (HDPE), low-density polyethylene (LDPE), ultrahigh molecular weight polyethylene (UHMWPE), polypropylene (PP), ethylene/propylene copolymer (EPR), ethylene/butene copolymer (EBR), ethylene/vinyl acetate copolymer (EVA), ethylene/vinyl acetate copolymer saponification product (EVOH), ethylene/acrylic acid copolymer (EAA), ethylene/methacrylic acid copolymer (EMAA), ethylene/methyl acrylate copolymer (EMA), ethylene/methyl methacrylate copolymer (EMMA) and ethylene/ethyl acrylate (EEA); the above-described polyolefin-based resin where a functional group such as carboxyl group or its salt, acid anhydride group and epoxy group is incorporated; a polyester-based resin such as polybutylene terephthalate (PBT), polyethylene terephthalate (PET), polyethylene isophthalate (PEI), PET/PEI copolymer, polyarylate (PAR), polyethylene naphthalate (PEN), polybutylene naphthalate (PBN) and liquid crystal polyester (LCP); a polyether-based resin such as polyacetal (POM) and polyphenylene oxide (PPO); a polysulfone-based resin such as polysulfone (PSF) and polyether sulfone (PES); a polythioether-based resin such as polyphenylene sulfide (PPS) and polythioethersulfone (PTES); a polyketone-based resin such as polyether ether ketone (PEEK) and polyallyl ether ketone (PAEK); a polynitrile-based resin such as polyacrylonitrile (PAN), polymethacrylonitrile, acrylonitrile/styrene copolymer (AS), methacrylonitrile/styrene copolymer, acrylonitrile/butadiene/styrene copolymer (ABS) and methacrylonitrile/styrene/butadiene copolymer (MBS); a polymethacrylate-based resin such as polymethyl methacrylate (PMMA) and polyethyl methacrylate (PEMA); a polyvinyl-based resin such as polyvinyl alcohol (PVA), polyvinylidene chloride (PVDC), polyvinyl chloride (PVC), vinyl chloride/vinylidene chloride copolymer and vinylidene chloride/methyl acrylate copolymer; a cellulose-based resin such as cellulose acetate and cellulose butyrate; a polyimide-based resin such as thermoplastic polyimide (PI), polyamideimide (PAI) and polyetherimide; and thermoplastic polyurethane-based resin. One species or two or more species thereof may be used.

In the (A) polyamide 11 and/or polyamide 12, a plasticizer is preferably added. Examples of the plasticizer include benzenesulfonic acid alkylamides, toluene-sulfonic acid alkylamides and hydroxybenzoic acid alkyl esters.

Examples of the benzenesulfonic acid alkylamides include benzenesulfonic acid propylamide, benzenesulfonic acid butylamide and benzenesulfonic acid 2-ethylhexylamide.

Examples of the toluenesulfonic acid alkylamides include N-ethyl-o-toluenesulfonic acid butylamide, N-ethyl-p-toluenesulfonic acid butylamide, N-ethyl-o-toluenesulfonic acid 2-ethylhexylamide and N-ethyl-p-toluenesulfonic acid 2-ethylhexylamide.

Examples of the hydroxybenzoic acid alkyl esters include ethylhexyl o- or p-hydroxybenzoate, hexyldecyl o- or p-hydroxybenzoate, ethyldecyl o- or p-hydroxybenzoate, octyloctyl o- or p-hydroxybenzoate, decyldodecyl o- or p-hydroxybenzoate, methyl o- or p-hydroxybenzoate, butyl o- or p-hydroxybenzoate, hexyl o- or p-hydroxybenzoate, n-octyl o- or p-hydroxybenzoate, decyl o- or p-hydroxybenzoate, and dodecyl o- or p-hydroxybenzoate. One species or two or more species thereof may be used.

Among these, preferred are benzenesulfonic acid alkylamides such as benzenesulfonic acid butylamide and benzenesulfonic acid 2-ethylhexylamide, toluenesulfonic acid alkylamides such as N-ethyl-p-toluenesulfonic acid butylamide and N-ethyl-p-toluenesulfonic acid 2-ethylhexylamide, and hydroxybenzoic acid alkyl esters such as ethylhexyl p-hydroxybenzoate, hexyldecyl p-hydroxybenzoate and ethyldecyl p-hydroxybenzoate, more preferred are benzenesulfonic acid butylamide, ethylhexyl p-hydroxybenzoate and hexyldecyl p-hydroxybenzoate.

The amount of the plasticizer blended is preferably from 1 to 30 parts by weight, more preferably from 1 to 15 parts by weight, per 100 parts by weight of the (A) polyamide 11 and/or polyamide 12 component. If the amount of the plasticizer blended exceeds 30 parts by weight, the low-temperature impact resistance of the multilayer tube may decrease.

In the (A) polyamide 11 and/or polyamide 12, an impact resistance improver is preferably added. The impact resistance improver includes a rubber-like polymer, and the flexural modulus thereof as measured according to ASTM D-790 is preferably 500 MPa or less. If the flexural modulus exceeds this value, a sufficiently high impact resistance improving effect may not be obtained.

Examples of the impact resistance improver include an (ethylene and/or propylene).α-olefin-based copolymer, an (ethylene and/or propylene).(α,β-unsaturated carboxylic acid and/or unsaturated carboxylic acid ester)-based copolymer, an ionomeric polymer and an aromatic vinyl compound.conjugated diene compound-based block copolymer. One species or two or more species thereof may be used.

The (ethylene and/or propylene).α-olefin-based copolymer is a polymer obtained by copolymerizing an ethylene and/or propylene with an α-olefin having a carbon number of 3 or more. Examples of the α-olefin having a carbon number of 3 or more include propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 9-methyl-1-decene, 11-methyl-1-dodecene and 12-ethyl-1-tetradecene. One species or two or more species thereof may be used.

Also, a polyene of a non-conjugated diene such as 1,4-pentadiene, 1,4-hexadiene, 1,5-hexadiene, 1,4-octadiene, 1,5-octadiene, 1,6-octadiene, 1,7-octadiene, 2-methyl-1,5-hexadiene, 6-methyl-1,5-heptadiene, 7-methyl-1,6-octadiene, 4-ethylidene-8-methyl-1,7-nonadiene, 4,8-dimethyl-1,4,8-decatriene (DMDT), dicyclopentadiene, cyclohexadiene, cyclooctadiene, 5-vinylnorbornene, 5-ethylidene-2-norbornene, 5-methylene-2-norbornene, 5-isopropylidene-2-norbornene, 6-chloromethyl-5-isopropenyl-2-norbornene, 2,3-diisopropylidene-5-norbornene, 2-ethylidene-3-isopropylidene-5-norbornene and 2-propenyl-2,5-norbornadiene, may be copolymerized. One species or two or more species thereof may be used.

The (ethylene and/or propylene).(α,β-unsaturated carboxylic acid and/or unsaturated carboxylic acid ester)-based copolymer is a polymer obtained by copolymerizing an ethylene and/or propylene with an α,β-unsaturated carboxylic acid and/or unsaturated carboxylic acid ester monomer. Examples of the α,β-unsaturated carboxylic acid monomer include an acrylic acid and a methacrylic acid, and examples of the α,β-unsaturated carboxylic acid ester monomer include a methyl ester, an ethyl ester, a propyl ester, a butyl ester, a pentyl ester, a hexyl ester, a heptyl ester, an octyl ester, a nonyl ester and a decyl ester of those unsaturated carboxylic acids. One species or two or more species thereof may be used.

The ionomeric polymer is a copolymer of an olefin and an α,β-unsaturated carboxylic acid, where at least a part of the carboxyl group is ionized by the neutralization of a metal ion. The olefin is preferably an ethylene. The α,β-unsaturated carboxylic acid is preferably an acrylic acid or a methacrylic acid but is not limited thereto and an unsaturated carboxylic acid ester monomer may be copolymerized. Examples of the metal ion include an alkali metal and an alkaline earth metal, such as Li, Na, K, Mg, Ca, Sr and Ba, and metals such as Al, Sn, Sb, Ti, Mn, Fe, Ni, Cu, Zn and Cd. One species or two or more species thereof may be used.

The aromatic vinyl compound.conjugated diene compound-based block copolymer is a block copolymer consisting of an aromatic vinyl compound-based polymer block and a conjugated diene compound-based polymer block. A block copolymer having at least one aromatic vinyl compound-based polymer block and at least one conjugated diene compound-based polymer block is used. In this block copolymer, an unsaturated bond in the conjugated diene compound-based polymer block may be hydrogenated.

The aromatic vinyl compound-based polymer block is a polymer block mainly comprising a structural unit derived from an aromatic vinyl compound. Examples of the aromatic vinyl compound include styrene, α-methylstyrene, o-methylstyrene, m-methylstyrene, p-methylstyrene, 2,4-dimethylstyrene, 2,6-dimethylstyrene, vinylnaphthalene, vinylanthracene, 4-propylstyrene, 4-cyclohexylstyrene, 4-dodecylstyrene, 2-ethyl-4-benzylstyrene and 4-(phenylbutyl)styrene. One species or two or more species thereof may be used. Depending on the case, the aromatic vinyl compound-based polymer block may have a slight amount of a structural unit comprising other unsaturated monomers.

The conjugated diene-based polymer block is a polymer block formed from one species or two or more species of conjugated diene-based compounds such as 1,3-butadiene, chloroprene, isoprene, 2,3-dimethyl-1,3-butadiene, 1,3-pentadiene, 4-methyl-1,3-pentadiene and 1,3-hexadiene. In the hydrogenated aromatic vinyl compound/conjugated diene block copolymer, the unsaturated bond moiety in the conjugated diene compound-based polymer block is partially or entirely hydrogenated to form a saturated bond.

The molecular structure of the aromatic vinyl compound/conjugated diene compound-based block copolymer or a hydrogenated product thereof may be linear, branched or radial or may be an arbitrary combination thereof. Among these, one species or two or more species of a diblock copolymer where one aromatic vinyl compound-based polymer block and one conjugated diene compound-based polymer block are linearly bonded, a triblock copolymer where three polymer blocks are linearly bonded in the order of aromatic vinyl compound-based polymer block-conjugated diene compound-based polymer block-aromatic vinyl compound-based polymer block, and a hydrogenated product thereof are preferably used as the aromatic vinyl compound/conjugated diene compound-based block copolymer and/or a hydrogenated product thereof. Examples thereof include an unhydrogenated or hydrogenated styrene/butadiene block copolymer, an unhydrogenated or hydrogenated styrene/isoprene block copolymer, an unhydrogenated or hydrogenated styrene/isoprene/styrene block copolymer, an unhydrogenated or hydrogenated styrene/butadiene/styrene block copolymer, and an unhydrogenated or hydrogenated styrene/(isoprene/butadiene)/styrene block copolymer.

These (ethylene and/or propylene).α-olefin-based copolymer, (ethylene and/or propylene).(α,β-unsaturated carboxylic acid and/or unsaturated carboxylic acid ester)-based copolymer, ionomeric polymer, and aromatic vinyl compound/conjugated diene compound-based block copolymer, which are used as the impact resistance improver, are preferably a polymer modified with a carboxylic acid and/or a derivative thereof. By the modification with such a component, a functional group having affinity for the polyamide-based resin is incorporated into the polymer molecule.

Examples of the functional group having affinity for the polyamide-based resin include a carboxylic acid group, a carboxylic anhydride group, a carboxylic acid ester group, a carboxylic acid metal salt group, a carboxylic acid imide group, a carboxylic acid amide group and an epoxy group. Examples of the compound containing such a functional group include acrylic acid, methacrylic acid, maleic acid, fumaric acid, itaconic acid, crotonic acid, mesaconic acid, citraconic acid, glutaconic acid, cis-4-cyclohexene-1,2-dicarboxylic acid, endo-bicyclo[2.2.1]-5-heptene-2,3-dicarboxylic acid, a metal salt of such carboxylic acid, monomethyl maleate, monomethyl itaconate, methyl acrylate, ethyl acrylate, butyl acrylate, 2-ethylhexyl acrylate, hydroxyethyl acrylate, methyl methacrylate, 2-ethylhexyl methacrylate, hydroxyethyl methacrylate, aminoethyl methacrylate, dimethyl maleate, dimethyl itaconate, maleic anhydride, itaconic anhydride, citraconic anhydride, endo-bicyclo-[2.2.1]-5-heptene-2,3-dicarboxylic anhydride, maleimide, N-ethylmaleimide, N-butylmaleimide, N-phenylmaleimide, acrylamide, methacrylamide, glycidyl acrylate, glycidyl methacrylate, glycidyl ethacrylate, glycidyl itaconate and glycidyl citraconate. One species or two or more species thereof may be used.

The amount of the impact resistance improver blended is preferably from 1 to 35 parts by weight, more preferably from 5 to 25 parts by weight, per 100 parts by weight of the (A) polyamide 11 and/or polyamide 12 component. If the amount of the impact resistance improver blended exceeds 35 parts by weight, the mechanical properties inherent in the multilayer tube may be impaired.

In the (A) polyamide 11 and/or polyamide 12, an antioxidant, a heat stabilizer, an ultraviolet absorbent, a light stabilizer, a lubricant, an inorganic filler, an antistatic agent, a flame retardant, a crystallization accelerator and the like may be further added, if desired.

The production apparatus for the production of the (A) polyamide 11 and/or polyamide 12 includes a known polyamide production apparatus such as batch-system reactor, one-bath or multi-bath continuous reaction apparatus, tubular continuous reaction apparatus and kneading reaction extruder (e.g., single-screw kneading extruder, twin-screw kneading extruder). As for the polymerization method, the polymerization may be performed by using a known method such as melt polymerization, solution polymerization or solid phase polymerization and repeating the operation under atmospheric pressure, reduced pressure or applied pressure. These polymerization methods may be used individually or in an appropriate combination.

The relative viscosity of the (A) polyamide 11 and/or polyamide 12, as measured according to JIS K-6920, is preferably from 1.5 to 4.0, more preferably from 2.0 to 3.5. If the relative viscosity is less than this value, the multilayer tube obtained may have insufficient mechanical properties, whereas if it exceeds the value above, the extrusion pressure or torque becomes excessively high and this sometimes makes it difficult to produce a multilayer tube.

The (B) semi-aromatic polyamide comprises a dicarboxylic acid unit containing a terephthalic acid and/or naphthalenedicarboxylic acid unit in a proportion of 50 mol % or more based on all dicarboxylic acid units, and a diamine unit containing an aliphatic diamine unit having a carbon number of 9 to 13 in a proportion of 60 mol % or more based on all diamine units (hereinafter, this polyamide is sometimes referred to as a "(B) semi-aromatic polyamide").

The content of the terephthalic acid and/or naphthalenedicarboxylic acid unit in the (B) semi-aromatic polyamide is 50 mol % or more, preferably 60 mol % or more, more preferably 75 mol % or more, still more preferably 90 mol % or more, based on all dicarboxylic acid units. If the content of the terephthalic acid and/or naphthalenedicarboxylic acid unit is less than 50 mol %, the multilayer tube obtained tends to decrease in various physical properties such as heat resistance, chemical resistance and alcohol gasoline permeation-preventing property. Examples of the naphthalenedicarboxylic acid unit include units derived from a 2,6-naphthalenedicarboxylic acid, 2,7-naphthalenedicarboxylic acid and 1,4-naphthalenedicarboxylic acid. One species or two or more species thereof may be used. Among these naphthalenecarboxylic acid units, a unit derived from a 2,6-naphthalenedicarboxylic acid is preferred.

The dicarboxylic acid unit in the (B) semi-aromatic polyamide may contain a unit derived from other dicarboxylic acids except for a terephthalic acid and/or naphthalenedicarboxylic acid unit within a range of not impairing various excellent properties of the multilayer tube of the present invention. Examples of the other dicarboxylic acid unit include units derived from an aliphatic dicarboxylic acid such as malonic acid, dimethylmalonic acid, succinic acid, glutaric acid, adipic acid, 2-methyladipic acid, trimethyladipic acid, pimelic acid, 2,2-dimethylglutaric acid, 2,2-diethylsuccinic acid, suberic acid, azelaic acid and sebacic acid; an alicyclic dicarboxylic acid such as 1,3-cyclopentanedicarboxylic acid and 1,3/1,4-cyclohexanedicarboxylic acid; and an aromatic dicarboxylic acid such as isophthalic acid, 1,3/1,4-phenylenedioxydiacetic acid, 4,4-oxydibenzoic acid, diphenylmethane-4,4-dicarboxylic acid, diphenylsulfone-4,4-dicarboxylic acid and 4,4-diphenyldicarboxylic acid. One species or two or more species thereof may be used. Among these units, a unit derived from an aromatic dicarboxylic acid is preferred. The content of the other dicarboxylic acid unit is 50 mol % or less, preferably 40 mol % or less, more preferably 25 mol % or less, still more preferably 10 mol % or less. In addition, a unit derived from a polyvalent carboxylic acid such as trimellitic acid, trimesic acid and pyromellitic acid may also be contained within a range of allowing for melt processing.

The content of the aliphatic diamine unit having a carbon number of 9 to 13 in the (B) semi-aromatic polyamide is 60 mol % or more, preferably 75 mol % or more, more preferably 90 mol % or more, based on all amine units. If the content of the aliphatic diamine unit having a carbon number of 9 to 13 is less than 60 mol %, the multilayer tube tends to decrease in heat resistance, low water absorption and impact resistance. Also, in the multilayer tube, the interlayer adhesion to the layer (a) comprising (A) polyamide 11 and/or polyamide 12 tends to deteriorate.

Examples of the aliphatic diamine unit having a carbon number of 9 to 13 include units derived from 1,9-nonanediamine, 1,10-decanediamine, 1,11-undecanediamine, 1,12-dodecanediamine and 1,13-tridecanediamine. As long as the above-described carbon number is satisfied, not only a linear aliphatic diamine unit but also a unit derived from a branched aliphatic diamine such as 2-methyl-1,8-octanediamine and 5-methyl-1,9-nonanediamine may be contained. One species or two or more species thereof may be used.

Among these aliphatic diamine units having a carbon number of 9 to 13, a unit derived from 1,9-nonanediamine and/or 2-methyl-1,8-octanediamine is preferred in view of profitability and alcohol gasoline permeation-preventing property, and a unit derived from 1,12-dodecanediamine is preferred in view of interlayer adhesion to the layer (a) comprising (A) polyamide 11 and/or polyamide 12 and low-temperature impact resistance. Furthermore, in view of balance of processability, impact resistance and coextrusion moldability, the molar ratio between 1,9-nonanediamine unit and 2-methyl-1,8-octanediamine unit is preferably from 30:70 to 98:2, more preferably from 40:60 to 95:5.

The diamine unit in the (B) semi-aromatic polyamide may contain a unit derived from other diamines except for an aliphatic diamine unit having a carbon number of 9 to 13 within a range of not impairing various excellent properties of the multilayer tube. Examples of the other diamine unit include units derived from an aliphatic diamine such as ethylenediamine, 1,3-propylenediamine, 1,4-butanediamine, 1,5-pentanediamine, 1,6-hexanediamine, 1,7-heptanediamine, 1,8-octanediamine, 1,14-tetradecanediamine, 1,15-pentadecanediamine, 1,16-hexadecanediamine, 1,17-heptadecanediamine, 1,18-octadecanediamine, 1,19-nonadecanediamine, 1,20-eicosanediamine and 2/3-methyl-1,5-pentanediamine; an alicyclic diamine such as 1,3/1,4-cyclohexanediamine, 1,3/1,4-cyclohexanedimethylamine, bis(4-aminocyclohexyl)methane, bis(4-aminocyclohexyl) propane, bis(3-methyl-4-aminocyclohexyl)methane, bis(3-methyl-4-aminocyclohexyl) propane, 5-amino-2,2,4-trimethyl-1-cyclopentanemethylamine, 5-amino-1,3,3-trimethylcyclohexanemethylamine, bis(aminopropyl)piperazine, bis(aminoethyl)piperazine, norbornanedimethylamine and tricyclodecanedimethylamine; and an aromatic diamine such as p-phenylenediamine, m-phenylenediamine, p-xylylenediamine, m-xylylenediamine, 4,4'-diaminodiphenylmethane, 4,4'-diaminodiphenylsulfone and 4,4'-diaminodiphenyl ether. One species or two or more species thereof may be used. The content of the other diamine unit is 40 mol % or less, preferably 25 mol % or less, still more preferably 10 mol % or less.

The relative viscosity of the (B) semi-aromatic polyamide as measured according to JIS K-6920 is preferably from 1.5 to 4.0, more preferably from 1.8 to 3.5, still more preferably from 2.0 to 3.0. If the relative viscosity is less than this value, the multilayer tube obtained may have insufficient mechanical properties, whereas if it exceeds the value above, the extrusion pressure or torque becomes excessively high and this sometimes makes it difficult to produce a multilayer tube.

The production apparatus for the (B) semi-aromatic polyamide includes a known polyamide production apparatus such as batch-system reactor, one-bath or multi-bath continuous reaction apparatus, tubular continuous reaction apparatus and kneading reaction extruder (e.g., single-screw kneading extruder, twin-screw kneading extruder). As for the polymerization method, the polymerization may be performed by using a known method such as melt polymerization, solution polymerization or solid phase polymerization and repeating the operation under atmospheric pressure, reduced pressure or applied pressure. These polymerization methods may be used individually or in an appropriate combination.

The (B) semi-aromatic polyamide may be a homopolymer, a mixture of homopolymers, a mixture with the above-described copolymer, or a mixture with other polyamide-based resins or other thermoplastic resins. In the mixture, the content of the (B) semi-aromatic polyamide is preferably 80 wt % or more, more preferably 90 wt % or more. Examples of the other polyamide-based resin and the other thermoplastic resin are the same as those resins described above for the (A) polyamide 11 and/or polyamide 12. Furthermore, a mixture with the (A) polyamide 11 and/or polyamide 12 may also be used.

In the (B) semi-aromatic polyamide, an antioxidant, a heat stabilizer, an ultraviolet absorbent, a light stabilizer, a lubricant, an inorganic filler, an antistatic agent, a flame retardant, a crystallization accelerator, a plasticizer, a colorant, a lubricating agent, an impact resistance improver and the like may be further added, if desired.

The (C) fluorine-containing polymer having introduced into the molecular chain thereof a functional group having reactivity with a polyamide-based resin, indicates a fluorine-containing polymer where a functional group having reactivity with a polyamide-based resin is present in the molecular structure (hereinafter sometimes referred to as a "(C) fluorine-containing polymer").

The (C) fluorine-containing polymer is a polymer (homopolymer or copolymer) having a repeating unit derived from at least one fluorine-containing monomer. This fluorine-containing polymer is not particularly limited as long as it can be heat-melt processed. Examples thereof include polyvinylidene fluoride (PVDF), polyvinyl fluoride (PVF), polytetrafluoroethylene (PTFE), polychlorotrifluoroethylene (PCTFE), a tetrafluoroethylene/perfluoroalkyl ether copolymer (PFA), a tetrafluoroethylene/hexafluoropropylene copolymer (FEP), an ethylene/tetrafluoroethylene copolymer (ETFE), an ethylene/tetrafluoroethylene/hexafluoropropylene copolymer, a vinylidene fluoride/tetrafluoroethylene copolymer, a vinylidene fluoride/hexafluoropropylene copolymer, a vinylidene fluoride/pentafluoropropylene copolymer, a tetrafluoroethylene/hexafluoropropylene/vinylidene fluoride copolymer (THV), a vinylidene fluoride/pentafluoropropylene/tetrafluoroethylene copolymer, a vinylidene fluoride/perfluoroalkyl vinyl ether/tetrafluoroethylene copolymer, an ethylene/chlorotrifluoroethylene copolymer (ECTFE) and a vinylidene fluoride/chlorotrifluoroethylene copolymer. One species or two or more species thereof may be used.

Among these (C) fluorine-containing polymers, preferred are a fluorine-containing polymer having a tetrafluoroethylene unit as the essential component in view of heat resistance and chemical resistance, and a fluorine-containing polymer having a vinylidene fluoride unit as the essential component in view of processing, and more preferred are an ethylene/tetrafluoroethylene copolymer (ETFE), polyvinylidene fluoride (PVDF) and a tetrafluoroethylene/hexafluoropropylene/vinylidene fluoride copolymer (THV).

The ethylene/tetrafluoroethylene copolymer (hereinafter sometimes referred to as "ETFE") comprises an ethylene-based polymerization unit (hereinafter sometimes referred to as "E") and a tetrafluoroethylene-based polymerized unit (hereinafter sometimes referred to as "TFE"), and the polymerization ratio (by molar ratio) thereof is preferably from 80/20 to 20/80, more preferably from 70/30 to 30/70, still more preferably from 60/40 to 40/60.

If the molar ratio of (E-based polymerized unit)/(TFE-based polymerized unit) is excessively large, the heat resistance, weather resistance, chemical resistance, alcohol gasoline permeation-preventing property and the like of the ETFE may decrease, whereas if the molar ratio is too small, the mechanical strength, melt processability and the like may decrease. Within the above-described range, the ETFE can be excellent in the heat resistance, weather resistance, chemical resistance, alcohol gasoline permeation-preventing property, mechanical strength, melt processability and the like.

In the (C) fluorine-containing polymer, in addition to the E-based and TFE-based polymerized units, one or more other monomer may be contained within a range of not impairing the essential properties of the polymer.

Examples of the other monomer include α-olefins such as propylene and butene; a compound represented by $CH_2=CX(CF_2)_nY$ (wherein X and Y each is independently a hydrogen or fluorine atom, and n is an integer of 2 to 8); a fluoroolefin having a hydrogen atom in the unsaturated group, such as vinylidene fluoride (VDF), vinyl fluoride (VF), trifluoroethylene and hexafluoroisobutylene (HFIB); a fluoroolefin having no hydrogen atom in the unsaturated group, such as hexafluoropropylene (HFP), chlorotrifluoroethylene (CTFE), perfluoro(methyl vinyl ether) (PMVE), perfluoro (ethyl vinyl ether) (PEVE), perfluoro(propyl vinyl ether) (PPVE), perfluoro(butyl vinyl ether) (PBVE) and other perfluoro(alkyl vinyl ethers) (PAVE) (excluding TFE); a vinyl ether such as methyl vinyl ether (MVE), ethyl vinyl ether (EVE), butyl vinyl ether (BVE), isobutyl vinyl ether (IBVE) and cyclohexyl vinyl ether (CHVE); vinyl chloride, vinylidene chloride; vinyl esters such as vinyl acetate, vinyl chloroacetate, vinyl lactate, vinyl butyrate, vinyl pivalate, vinyl benzoate and vinyl crotonate; and a (meth)acrylic acid ester such as alkyl(meth)acrylate, (fluoroalkyl)acrylate and (fluoroalkyl)methacrylate. One species or two or more species thereof may be used.

In the (C) fluorine-containing polymer, a compound represented by the formula $CH_2=CX(CF_2)_nY$ (hereinafter referred to as "FAE") is preferably used. The content of the FAE-based polymerized unit is preferably from 0.01 to 20 mol %, more preferably from 0.1 to 15 mol %, still more preferably from 1 to 10 mol %, based on all polymerized units. If the FAE content is less than this value, reduction in the cracking resistance or generation of a fracture phenomenon under a stress may occur, whereas if it exceeds the value above, the mechanical strength may decrease.

FAE is, as described above, a compound represented by the formula: $CH_2=CX(CF_2)_nY$ (wherein each X and Y is independently a hydrogen atom or a fluorine atom, and n is an integer of 2 to 8). If n in the formula is less than 2, the fluorine-containing polymer may not be sufficiently modified (for example, prevented from generation of cracking at the processing of the copolymer or in the processed article), whereas if n in the formula exceeds 8, this may be disadvantageous in view of polymerization reactivity.

Examples of FAE include $CH_2=CF(CF_2)_2F$, $CH_2=CF(CF_2)_3F$, $CH_2=CF(CF_2)_4F$, $CH_2=CF(CF_2)_5F$, $CH_2=CF(CF_2)_8F$, $CH_2=CF(CF_2)_2H$, $CH_2=CF(CF_2)_3H$, $CH_2=CF(CF_2)_4H$, $CH_2=CF(CF_2)_5H$, $CH_2=CF(CF_2)_8H$, $CH_2=CH(CF_2)_2F$, $CH_2=CH(CF_2)_3F$, $CH_2=CH(CF_2)_4F$, $CH_2=CH(CF_2)_5F$, $CH_2=CH(CF_2)_8F$, $CH_2=CH(CF_2)_2H$, $CH_2=CH(CF_2)_3H$, $CH_2=CH(CF_2)_4H$, $CH_2=CH(CF_2)_5H$ and $CH_2=CH(CF_2)_8H$. One species or two or more species thereof may be used.

Among these, compounds represented by $CH_2=CH(CF_2)_nY$ are preferred. In this case, n in the formula is preferably n=2 to 4, because both the alcohol gasoline permeation-preventing property and the cracking resistance of the (C) fluorine-containing polymer are satisfied.

The vinylidene fluoride copolymer is a copolymer comprising vinylidene fluoride and at least one fluorine-containing monomer copolymerizable therewith. Examples of the fluorine-containing monomer copolymerizable with vinylidene fluoride include tetrafluoroethylene (TFE), hexafluoropropylene (HFP), chlorotrifluoroethylene (CTFE), hexafluoroisobutylene, hexafluoroacetone, pentafluoropropylene, trifluoroethylene, vinyl fluoride, a fluoro (alkyl vinyl ether) and chlorotrifluoroethylene. One species or two or more species thereof may be used. In the vinylidene fluoride copolymer, the content of the vinylidene fluoride-based polymerized unit is preferably at least 30 mol % or more based on all polymerized units. Preferred examples of the vinylidene fluoride copolymer include a tetrafluoroethylene/hexafluoropropylene/vinylidene fluoride copolymer (THV).

The (C) fluorine-containing polymer can be obtained by (co)polymerizing monomers constituting the polymer by a conventional polymerization method. Among these methods, a method using radical polymerization is predominantly used. More specifically, the means for initiating the polymerization is not limited as long as the polymerization radically proceeds, but the polymerization is initiated, for example, with use of an organic or inorganic radical polymerization initiator or under heat, light or ionizing radiation.

The production method of the (C) fluorine-containing polymer is not particularly limited, and a polymerization method using a commonly employed radical polymerization initiator is used. As for the polymerization method, a known method such as bulk polymerization, solution polymerization using an organic solvent (e.g., fluorohydrocarbon, chlorohydrocarbon, fluorochlorohydrocarbon, alcohol, hydrocarbon), suspension polymerization using an aqueous medium and, if necessary, an appropriate organic solvent, and emulsion polymerization using an aqueous medium and an emulsifier, may be employed.

Also, the polymerization may be a batch-system or continuous-system operation using a one-bath or multi-bath agitation-type polymerization apparatus or a tubular polymerization apparatus.

As for the radical polymerization initiator, the decomposition temperature thereof to obtain a half-life of 10 hours is preferably from 0 to 100° C., more preferably from 20 to 90° C. Specific examples of such a radical polymerization initiator include an azo compound such as 2,2'-azobisisobutyronitrile, 2,2'-azobis(2,4-dimethylvaleronitrile), 2,2'-azobis(2-methylvaleronitrile), 2,2'-azobis(2-cyclopropylpropionitrile), dimethyl 2,2'-azobisisobutyrate, 2,2'-azobis[2-(hydroxymethyl)propionitrile], 4,4'-azobis(4-cyanopentenoic acid); a hydroperoxide such as hydrogen peroxide, tert-butyl hydroperoxide and cumene hydroperoxide; a dialkyl peroxide such as di-tert-butyl peroxide and dicumyl peroxide; a non-fluorine type diacyl peroxide such as acetyl peroxide, isobutyryl peroxide, octanoyl peroxide, benzoyl peroxide and lauroyl peroxide; a ketone peroxide such as methyl ethyl ketone peroxide and cyclohexanone peroxide; a peroxy dicarbonate such as diisopropyl peroxydicarbonate; a peroxyester such as tert-butyl peroxypivalate, tert-butyl peroxyisobutyrate and tert-butyl peroxyacetate; a hydroperoxide such as tert-butyl hydroperoxide; a fluorine-containing diacyl peroxide such as compound represented by $(Z(CF_2)_pCOO)_2$ (wherein Z is a hydrogen atom, a fluorine atom or a chlorine atom, and p is an integer of 1 to 10); and an inorganic peroxide such as potassium persulfate, sodium persulfate and ammonium persulfate. One species or two or more species thereof may be used.

Also, at the production of the (C) fluorine-containing polymer, a normal chain transfer agent is preferably used so as to adjust the molecular weight. Examples of the chain transfer agent include an alcohol such as methanol and ethanol; a chlorofluorohydrocarbon such as 1,3-dichloro-1,1,2,2,3-pentafluoropropane, 1,2-dichloro-1,1,2,2-tetrafluoroethane, 1,1-dichloro-1-fluoroethane and 1,1,2-trichloro-1,2,2-trifluoroethane; a hydrocarbon such as pentane, hexane and cyclohexane; and a chlorohydrocarbon such as carbon tetrachloride, chloroform, methylene chloride and methyl chloride. One species or two or more species thereof may be used.

The polymerization conditions are not particularly limited, but the polymerization temperature is preferably from 0 to 100° C., more preferably from 20 to 90° C. The polymerization pressure is appropriately selected according to the kind and amount of the solvent used and other polymerization conditions such as vapor pressure and polymerization temperature, but this is preferably from 0.1 to 10 MPa, more preferably from 0.5 to 3 MPa. The polymerization time is preferably from 1 to 30 hours.

The (C) fluorine-containing polymer is not particularly limited in its molecular weight but is preferably a polymer which is a solid at room temperature and is usable in itself as a thermoplastic resin, elastomer or the like. The molecular weight is controlled by the monomer concentration, polymerization initiator concentration, chain transfer agent concentration, and temperature.

In the case of coextruding the (C) fluorine-containing polymer with a polyamide-based resin such as (A) and (B) above, a sufficiently high melt flowability is preferably ensured within a kneading temperature or processing temperature range of not causing extreme deterioration of the other party material. The melt flow rate of the (C) fluorine-containing polymer under a load of 5 kg at a temperature 50° C. higher than the melting point is preferably from 0.5 to 200 g/10 min, more preferably from 1 to 100 g/10 min.

Also, the melting point and glass transition point of the (C) fluorine-containing polymer may be controlled by selecting, for example, the kind of the fluorine-containing monomer or other monomers or the compositional ratio.

The melting point of the (C) fluorine-containing polymer is appropriately selected according to the purpose, use or application method but, in the case of coextrusion with a polyamide-based resin such as (A) and (B) above, the melting point is preferably close to the processing temperature of the polyamide-based resin. Accordingly, it is preferred to optimize the melting point of the (C) fluorine-containing polymer by appropriately adjusting the ratio of the fluorine-containing monomer, other monomers and the functional group-containing monomer which is described below.

The (C) fluorine-containing polymer contains a functional group having reactivity with a polyamide-based resin, in the molecular structure. The functional group may be contained in any of the molecular terminal, the side chain and the main chain of the (C) fluorine-containing polymer. Furthermore, in the (C) fluorine-containing polymer, one functional group may be used alone, or two or more kinds of functional groups may be used in combination. The kind and content of the functional group are appropriately determined according to the kind, shape or use end of the other party material laminated on the (C) fluorine-containing polymer, the required interlayer adhesion, the bonding method, the functional group-introducing method and the like.

The functional group having reactivity with a polyamide-based resin includes at least one member selected from a carboxyl group, an acid anhydride group or a carboxylate, an alkoxycarbonyl group, a hydroxyl group, a sulfo group or a sulfonate, an epoxy group, a cyano group, a carbonate group and a carboxylic acid halide group. In particular, at least one member selected from a carboxyl group, an acid anhydride group, a hydroxyl group, an epoxy group, a carbonate group and a carboxylic acid halide group is preferred.

Examples of the method for introducing the above-described functional group having reactivity into the (C) fluorine-containing polymer include (i) a method of copolymerizing a copolymerizable monomer having the functional group at the production of the (C) fluorine-containing polymer, (ii) a method of introducing the functional group into the molecular terminal of the (C) fluorine-containing polymer at the polymerization by a polymerization initiator, a chain transfer agent or the like, and (iii) a method of grafting a compound (graft compound) containing the functional group having reactivity and a functional group capable of grafting, to the (C) fluorine-containing polymer. These introducing methods may be used individually or in an appropriate combination. Considering the durability of interlayer adhesive strength of the multilayer tube during immersion in fuel, the (C) fluorine-containing polymer is preferably produced by (i) or (ii). As for the method (iii), the production methods described in Japanese Unexamined Patent Publication (Kokai) Nos. 7-18035, 7-25952, 7-25954, 7-173230, 7-173446 and 7-173447 and Japanese Unexamined Patent Publication (Kohyo) No. 10-503236 may be referred to. The (i) method of copolymerizing a copolymerizable monomer having the functional group at the production of the fluorine-containing polymer, and the (ii) method of introducing the functional group into the molecular terminal of the fluorine-containing polymer by a polymerization initiator, a chain transfer agent or the like are described below.

In the (i) method of copolymerizing a copolymerizable monomer having the functional group (hereinafter, sometimes simply referred to as a "functional group-containing monomer") at the production of the (C) fluorine-containing polymer, a monomer containing at least one functional group selected from a carboxyl group, an acid anhydride group or a carboxylate, an alkoxycarbonyl group, a hydroxyl group, a sulfo group or a sulfonate, an epoxy group and a cyano group is used as the polymerization monomer. Examples of the functional group-containing monomer include a functional group-containing non-fluorine monomer and a functional group-containing fluorine-containing monomer.

Examples of the functional group-containing non-fluorine monomer include an unsaturated carboxylic acid and a derivative (e.g., ester) thereof, such as acrylic acid, halogenated acrylic acid (excluding fluorine), methacrylic acid, halogenated methacrylic acid (excluding fluorine), maleic acid, halogenated maleic acid (excluding fluorine), fumaric acid, halogenated fumaric acid (excluding fluorine), itaconic acid, citraconic acid, crotonic acid and endobicyclo-[2.2.1]-5-heptene-2,3-dicarboxylic acid; a carboxyl group-containing monomer such as maleic anhydride, itaconic anhydride, succinic anhydride, citraconic anhydride and endobicyclo-[2.2.1]-5-heptene-2,3-dicarboxylic anhydride; an epoxy group-containing monomer such as glycidyl acrylate, glycidyl methacrylate and glycidyl ether; and a hydroxyl group-containing monomer such as hydroxyethyl acrylate, hydroxyethyl methacrylate, hydroxypropyl acrylate, hydroxypropyl methacrylate and hydroxyalkyl vinyl ether. One species or two or more species thereof may be used.

Specific examples of the functional group-containing fluorine-containing monomer include: $CF_2=CFOCF_2CF_2COOH$, $CF_2=CFO(CF_2)_3COOH$, $CF_2=CFOCF_2CF(CF_3)OCF_2CF_2COOH$, $CF_2=CFOCF_2CF(CF_3)OCF_2CF(CF_3)OCF_2CF_2COOH$, $CF_2=CFCF_2COOH$, $CF_2=CFCF_2CF_2COOH$, $CF_2=CFOCF_2CF_2COONH_4$, $CF_2=CFO(CF_2)_3COONa$, $CF_2=CFOCF_2CF(CF_3)OCF_2CF_2COONH_4$, $CF_2=CFOCF_2CF(CF_3)OCF_2CF(CF_3)OCF_2CF_2COONa$, $CF_2=CFCF_2COONH_4$, $(CF_2=CFCF_2CF_2COO)_2Zn$, $CF_2=CFOCF_2CF_2CH_2OH$, $CF_2=CFO(CF_2)_3CH_2OH$, $CF_2=CFOCF_2CF(CF_3)OCF_2CF_2CH_2OH$, $CF_2=CFCF_2CH_2OH$, $CF_2=CFCF_2CF_2CH_2OH$, $CF_2=CFOCF_2CF_2SO_3H$, $CF_2=CFOCF_2CF(CF_3)OCF_2CF_2SO_3H$, $CF_2=CFOCF_2CF(CF_3)OCF_2CF_2CN$, $CF_2=CFCF_2OCF_2CF_2CF_2COOH$, $CF_2=CFCF_2OCFCF(CF_3)COOH$, $CF_2=CFCF_2OCF_2CF_2CF_2COONH_4$, $CF_2=CFCF_2OCFCF(CF_3)COONH_4$, $CF_2=CFCF_2OCF_2CF_2CF_2COONa$, $(CF_2=CFCF_2OCFCF(CF_3)COO)_2Zn$, $CF_2=CFCF_2OCF_2CF_2CF_2CH_2OH$, $CF_2=CFCF_2OCFCF(CF_3)CH_2OH$, $CF_2=CFCF_2OCF_2CF_2CF_2SO_3H$, $CF_2$=$CFCF_2OCF_2CF_2CF_2CN$,
$CH_2$=$CFCF_2CF_2CH_2COOH$, $CH_2$=$CFCF_2CF_2COOH$,
$CH_2$=$CF(CF_2)_8COOH$, $CH_2$=$CF(CF_2)_4CH_2COOH$,
$CH_2$=$CFCF_2OCF(CF_3)COOH$, $CH_2$=$CFCF_2OCF(CF_3)CF_2OCF(CF_3)COOH$, $CH_2$=$CFCF_2CF_2CH_2COONH_4$,
$CH_2$=$CFCF_2CF_2COONa$, $(CH_2$=$CF(CF_2)_4CH_2COO)_2Zn$,
$CH_2$=$CFCF_2OCF(CF_3)COONH_4$, $CH_2$=$CFCF_2OCF(CF_3)CF_2OCF(CF_3)COONH_4$, $(CH_2$=$CFCF_2OCF(CF_3)CF_2OCF(CF_3)COO)_2Zn$, $CH_2$=$CFCF_2CF_2CH_2CH_2OH$,
$CH_2$=$CFCF_2CF_2CH_2OH$, $CH_2$=$CF(CF_2)_8CH_2CH_2OH$,
$CH_2$=$CFCF_2OCF(CF_3)CH_2OH$, $CH_2$=$CFCF_2OCF(CF_3)CF_2OCF(CF_3)CH_2OH$, $CH_2$=$CHCF_2CF_2CH_2COOH$,
$CH_2$=$CH(CF_2)_2CH_2CH_2COOH$, $CH_2$=$CH(CF_2)_4CH_2CH_2COOH$, $CH_2$=$CH(CF_2)_6CH_2COOH$, $CH_2$=$CH(CF_2)_4CH_2COONH_4$, $CH_2$=$CH(CF_2)_4CH_2CH_2COONa$, $(CH_2$=$CH(CF_2)_6CH_2COO)_2Zn$,
$CH_2$=$CHCF_2CF_2CH_2CH_2OH$, $CH_2$=$CH(CF_2)_4CH_2CH_2CH_2OH$ and $CH_2$=$CH(CF_2)_6CH_2CH_2OH$. One species or two or more species thereof may be used.

The content of the functional group-containing monomer in the (C) fluorine-containing polymer is preferably from 0.05 to 20 mol %, more preferably from 0.05 to 10 mol %, still more preferably from 0.1 to 5 mol %, based on all polymerized units.

If the functional group-containing monomer content is less than 0.05 mol %, sufficiently high interlayer adhesion can be hardly obtained and, depending on the use environment conditions, reduction in the interlayer adhesion, particularly, deterioration of fuel resistance of the interlayer adhesive strength, may occur, whereas if the content exceeds 20 mol %, this may cause reduction in the heat resistance or bring about separation, discoloration, foaming, elution or the like due to adhesion failure, discoloration or foaming during high-temperature processing or decomposition in use at a high temperature. As long as the above-described content is satisfied, the polymer may be a mixture of a fluorine-containing polymer having introduced thereinto a functional group and a fluorine-containing polymer having not introduced thereinto a functional group.

In the (ii) method of introducing the functional group into the molecular terminal of the fluorine-containing polymer by a polymerization initiator or the like, the (C) fluorine-containing polymer having a functional group at the molecular terminal is a polymer having a functional group at one terminal or both terminals of the polymer molecular chain, and the functional group introduced into the terminal is preferably a carbonate group or a carboxylic acid halide group.

The carbonate group introduced as a terminal group of the (C) fluorine-containing polymer is generally a group having a bond of —OC(=O)O—, and specific examples thereof include those having a structure of —OC(=O)O—R group [wherein R is a hydrogen atom, an organic group (for example, a C1-C20 alkyl group and a C2-C20 alkyl group having an ether group) or a Group I, II or VII element], such as —OC(=O)OCH_3, —OC(=O)OC_3H_7, —OC(=O)OC_8H_{17} and —OC(=O)OCH_2CH_2CH_2OCH_2CH_3. Specific examples of the carboxylic acid halide group include those having a structure of —COY [Y is a halogen element], such as —COF and —COCl. One species or two or more species thereof may be used.

In order to introduce a carbonate group into the molecular terminal of the polymer, various methods using a polymerization initiator or a chain transfer agent may be employed, but a method using a peroxide, particularly, a peroxydicarbonate, as the polymerization initiator is preferred in view of profitability and quality such as heat resistance and chemical resistance. Also, when a peroxydicarbonate is used, the polymerization temperature can be reduced and this is preferred because the initiation reaction does not involve a side reaction.

In order to introduce a carboxylic acid halide group into the molecular terminal of the polymer, various methods may be employed, but this can be achieved, for example, by heating and thereby thermally decomposing the carbonate group of the above-described fluorine-containing polymer having a carbonate group at the terminal (decarboxylation).

Examples of the peroxydicarbonate include diisopropyl peroxydicarbonate, di-n-isopropyl peroxydicarbonate, tert-butyl peroxyisopropyl dicarbonate, tert-butyl peroxymethacryloyloxyethyl dicarbonate, bis(4-tert-butylcyclohexyl) peroxydicarbonate and di-2-ethylhexyl peroxydicarbonate. One species or two or more species thereof may be used.

The amount of the peroxydicarbonate used varies depending on the kind (composition, etc.), molecular weight or polymerization conditions of the objective polymer, and the kind of the initiator used but is preferably from 0.05 to 20 parts by weight, more preferably from 0.1 to 10 parts by weight, per 100 parts by weight of the entire polymer obtained by the polymerization. The content of the carbonate group at the molecular terminal of the polymer can be controlled by adjusting the polymerization conditions. If the amount of the polymerization initiator used exceeds the value above, the polymerization rate may be difficult to control, whereas if the amount used is less than the value above, the polymerization rate may decrease. The method for adding the polymerization initiator is not particularly limited, and the polymerization initiator may be added en bloc at the initiation of polymerization or may be continuously added during the polymerization. The addition method is appropriately selected according to the decomposition reactivity of the polymerization initiator and the polymerization temperature.

The number of terminal functional groups is preferably from 150 to 3,000, more preferably from 200 to 2,000, still more preferably from 300 to 1,000, per the main-chain carbon number of $10^6$ in the (C) fluorine-containing polymer. If the number of functional groups is less than 150, sufficiently high interlayer adhesion can be hardly obtained and, depending on the use environment conditions, reduction in the interlayer adhesion, particularly, deterioration of fuel resistance of the interlayer adhesive strength, may occur, whereas if the number of functional groups exceeds 3,000, this may cause reduction in the heat resistance or bring about adhesion failure, discoloration or foaming at a high-temperature processing, or separation, discoloration, foaming, elution or the like due to decomposition in use at a high temperature. As long as the above-described number of functional groups is satisfied, the polymer may be a mixture of a fluorine-containing polymer having introduced thereinto a functional group and a fluorine-containing polymer having not introduced thereinto a functional group.

In this way, the (C) fluorine-containing polymer is a fluorine-containing polymer having introduced thereinto a functional group having reactivity with a polyamide-based resin. As described above, the (C) fluorine-containing polymer having introduced thereinto a functional group can itself maintain excellent properties peculiar to (C) a fluorine-containing polymer, such as heat resistance, water resistance, low frictional property, chemical resistance, weather resistance, antifouling property and alcohol gasoline permeation-preventing property, and this is advantageous in view of productivity and cost.

Furthermore, by virtue of containing a functional group in the molecular chain, excellent interlayer adhesion to another substrate can be directly imparted to various materials of which interlayer adhesion in a multilayer tube is insufficient or infeasible, without performing a special treatment such as surface treatment or coating an adhesive resin or the like.

In the (C) fluorine-containing polymer, various fillers such as an inorganic powder, glass fiber, carbon fiber, a metal oxide and carbon may be blended according to the purpose or usage within the range of not impairing the performance of the polymer. Other than the filler, a pigment, an ultraviolet absorbent or other arbitrary additives may also be mixed. In addition to the additives, a resin such as another fluorine-based resin and thermoplastic resin, a synthetic rubber or the like may also be blended and this enables, for example, enhancement of mechanical properties and weather resistance, importation of design property, prevention of electrostatic charging, or improvement of processability.

The (D) terminal modified polyamide satisfies $[A]>[B]+5$, wherein [A] is the terminal amino group concentration (µeq/g-polymer) of the polyamide and [B] is the terminal carboxyl group concentration (µeq/g-polymer) of the polyamide (hereinafter referred to as a "terminal modified polyamide"). $[A]>[B]+10$ is preferred, and $[A]>[B]+15$ is more preferred. If $[A]<[B]+5$, the interlayer adhesion to the other party material stacked thereon is poor and this is not preferred. Furthermore, $[A]>20$ is preferred, and $30<[A]<80$ is more preferred.

Incidentally, the terminal amino group concentration [A] (µeq/g-polymer) can be measured by dissolving the polyamide in a phenol/methanol mixed solution and titrating with 0.05 N hydrochloric acid. The terminal carboxyl group concentration [B] (µeq/g-polymer) can be measured by dissolving the polyamide in benzyl alcohol and titrating with a 0.05 N sodium hydroxide solution.

The (D) terminal modified polyamide is produced by using, as the starting material, a lactam, an aminocarboxylic acid or a nylon salt comprising a diamine and a dicarboxylic acid, and polymerizing or copolymerizing it.

Examples of the lactam include ε-caprolactam, enantholactam, undecanelactam, dodecanelactam, α-pyrrolidone and α-piperidone. Examples of the aminocarboxylic acid include 6-aminocaproic acid, 7-aminoheptanoic acid, 9-aminononanoic acid, 11-aminoundecanoic acid and 12-aminododecanoic acid. One species or two or more species thereof may be used.

Examples of the diamine constituting the nylon salt include an aliphatic diamine such as ethylenediamine, 1,3-propylenediamine, 1,4-butanediamine, 1,6-hexanediamine, 1,7-heptanediamine, 1,8-octanediamine, 1,9-nonanediamine, 1,10-decanediamine, 1,11-undecanediamine, 1,12-dodecanediamine, 2-methyl-1,5-pentanediamine, 2-methyl-1,8-octanediamine and 2,2,4/2,4,4-trimethyl-1,6-hexanediamine and 5-methyl-1,9-nonanediamine; an alicyclic diamine such as 1,3/1,4-cyclohexanedimethylamine, bis(4-aminocyclohexyl)methane, bis(3-methyl-4-aminocyclohexyl)methane, 5-amino-1,3,3-trimethylcyclohexanemethylamine, norbornanedimethylamine and tricyclodecanedimethylamine; and an aromatic diamine such as p-xylylenediamine and m-xylylenediamine. One species or two or more species thereof may be used.

Examples of the dicarboxylic acid constituting the nylon salt include an aliphatic dicarboxylic acid such as glutaric acid, adipic acid, pimelic acid, suberic acid, azelaic acid, sebacic acid, undecanedicarboxylic acid, dodecanedicarboxylic acid and 2,2,4-trimethyladipic acid; an alicyclic dicarboxylic acid such as 1,3/1,4-cyclohexanedicarboxylic acid, dicyclohexylmethane-4,4-dicarboxylic acid and norbornanedicarboxylic acid; and an aromatic dicarboxylic acid such as isophthalic acid, terephthalic acid and 1,4/2,6/2,7-naphthalenedicarboxylic acid. One species or two or more species thereof may be used.

Specific examples of the terminal modified polyamide include polycaproamide (polyamide 6), polyundecanamide (polyamide 11), polydodecanamide (polyamide 12), polyethylene adipamide (polyamide 26), polytetramethylene adipamide (polyamide 46), polyhexamethylene adipamide (polyamide 66), polyhexamethylene azelamide (polyamide 69), polyhexamethylene sebacamide (polyamide 610), polyhexamethylene undecamide (polyamide 611), polyhexamethylene dodecamide (polyamide 612), polyhexamethylene terephthalamide (polyamide 6T), polyhexamethylene isophthalamide (polyamide 6I), polynonamethylene dodecamide (polyamide 912), polynonamethylene terephthalamide (polyamide 9T), polytrimethylhexamethylene terephthalamide (polyamide TMHT), polynonamethylene isophthalamide (polyamide 9I), polynonamethylene hexahydroterephthalamide (polyamide 9T(H)), polynonamethylene naphthalamide (polyamide 9N), polydecamethylene dodecamide (polyamide 1012), polydecamethylene terephthalamide (polyamide 10T), polydecamethylene isophthalamide (polyamide 10I), polydecamethylene hexahydroterephthalamide (polyamide 10T(H)), polydecamethylene naphthalamide (polyamide 10N), polyundecamethylene terephthalamide (polyamide 11T), polyundecamethylene isophthalamide (polyamide 11I), polyundecamethylene hexahydroterephthalamide (polyamide 11T(H)), polyundecamethylene naphthalamide (polyamide 11N), polydodecamethylene dodecamide (polyamide 1212), polydodecamethylene terephthalamide (polyamide 12T), polydodecamethylene isophthalamide (polyamide 12I), polydodecamethylene hexahydroterephthalamide (polyamide 12T(H)), polydodecamethylene naphthalamide (polyamide 12N), polymetaxylylene adipamide (polyamide MXD6), polybis(4-aminocyclohexyl)methane dodecamide (polyamide PACM12), polybis(3-methyl-4-aminocyclohexyl)methane dodecamide (polyamidedimethyl PACM12), and a copolymer using several kinds of raw material monomers of these polyamides. One species or two or more species thereof may be used.

In view of heat resistance, mechanical strength, easy availability or alcohol gasoline permeation-preventing property of the multilayer tube obtained and interlayer adhesion to the (B) semi-aromatic polyamide, (C) fluorine-containing polymer or the like, preferred among these are polyamide 6, polyamide 11, polyamide 12, polyamide 46, polyamide 66, polyamide 610, polyamide 612, polyamide 9T, polyamide 9N, polyamide 12T and polyamide 12N.

The (D) terminal modified polyamide can be polymerized from the above-described monomer as a raw material by using a known polymerization method such as melt polymerization, solution polymerization or solid phase polymerization, and repeating the operation under atmospheric pressure, reduced pressure or applied pressure.

These polymerization methods may be used individually or in an appropriate combination. Examples of the apparatus which can be used for the polymerization include a batch-system reactor, a one-bath or multi-bath continuous polymerization apparatus, a tubular continuous polymerization apparatus and a kneading reaction extruder.

For example, the (D) terminal modified polyamide is produced by polymerizing or copolymerizing the above-described polyamide raw material in the presence of amines by a known method such as melt polymerization, solution polymerization or solid phase polymerization.

Alternatively, the terminal modified polyamide is produced by melt-kneading the polymerization product in the presence of amines. In this way, amines may be added at an arbitrary stage during polymerization or at an arbitrary stage during melt-kneading after polymerization, but considering the fuel resistance of interlayer adhesive strength in the multilayer tube, amines are preferably added at the stage of polymerization.

Examples of the amines include a monoamine, a diamine and a triamine. Other than the amines, carboxylic acids such as monocarboxylic acid, dicarboxylic acid and tricarboxylic acid may also be added, if desired, as long as the above-described condition of the terminal group concentrations is satisfied. The amines and the carboxylic acids may be added simultaneously or separately. Also, one species or two or more species of the following amines or carboxylic acids may be used.

Specific examples of the monoamine added include an aliphatic monoamine such as methylamine, ethylamine, propylamine, butylamine, pentylamine, hexylamine, heptylamine, octylamine, 2-ethylhexylamine, nonylamine, decylamine, undecylamine, dodecylamine, tridecylamine, tetradecylamine, pentadecylamine, hexadecylamine, octadecylamine, octadecyleneamine, eicosylamine and docosylamine; an alicyclic monoamine such as cyclohexylamine and methylcyclohexylamine; an aromatic monoamine such as aniline, benzylamine and β-phenylmethylamine; a symmetric secondary amine such as N,N-dimethylamine, N,N-diethylamine, N,N-dipropylamine, N,N-dibutylamine, N,N-dihexylamine and N,N-dioctylamine; and a mixed secondary amine such as N-methyl-N-ethylamine, N-methyl-N-butylamine, N-methyl-N-dodecylamine, N-methyl-N-octadecylamine, N-ethyl-N-hexadecylamine, N-ethyl-N-octadecylamine, N-propyl-N-hexadecylamine and N-propyl-N-benzylamine.

Specific examples of the diamine added include an aliphatic diamine such as ethylenediamine, 1,3-propylenediamine, 1,4-butanediamine, 1,5-pentanediamine, 1,6-hexanediamine, 1,7-heptanediamine, 1,8-octanediamine, 1,9-nonanediamine, 1,10-decanediamine, 1,11-undecanediamine, 1,12-dodecanediamine, 1,13-tridecanediamine, 1,14-tetradecanediamine, 1,15-pentadecanediamine, 1,16-hexadecanediamine, 1,17-heptadecanediamine, 1,18-octadecanediamine, 2/3-methyl-1,5-pentanediamine, 2-methyl-1,8-octanediamine, 2,2,4/2,4,4-trimethyl-1,6-hexanediamine and 5-methyl-1,9-nonanediamine; an alicyclic diamine such as 1,3/1,4-cyclohexanedimethylamine, bis(4-aminocyclohexyl)methane, bis(4-aminocyclohexyl)propane, bis(3-methyl-4-aminocyclohexyl)methane, bis(3-methyl-4-aminocyclohexyl)propane, 5-amino-2,2,4-trimethyl-1-cyclopentanemethylamine, 5-amino-1,3,3-trimethylcyclohexanemethylamine, bis(aminopropyl)piperazine, bis(aminoethyl)piperazine, norbornanedimethylamine and tricyclodecanedimethylamine; and an aromatic diamine such as p-xylylenediamine and m-xylylenediamine.

Specific examples of the triamine added include diethylenetriamine, bis(pentamethylene)triamine, bis(hexamethylene)triamine, bis(heptamethylene)triamine, bis(octamethylene)triamine, bis(nonamethylene)triamine, bis(decamethylene)triamine, bis(undecamethylene)triamine, bis(dodecamethylene)triamine and tris(2-aminoethyl)amine.

On the other hand, examples of the carboxylic acids added include an aliphatic monocarboxylic acid such as acetic acid, propionic acid, butyric acid, valeric acid, caproic acid, enanthic acid, caprylic acid, capric acid, pelargonic acid, undecanoic acid, lauric acid, tridecanoic acid, myristic acid, myristoleic acid, palmitic acid, stearic acid, oleic acid, linolic acid, arachic acid, behenic acid and erucic acid; an alicyclic monocarboxylic acid such as cyclohexanecarboxylic acid and methylcyclohexanecarboxylic acid; an aromatic monocarboxylic acid such as benzoic acid, toluic acid, ethylbenzoic acid and phenylacetic acid; an aliphatic dicarboxylic acid such as malonic acid, succinic acid, glutaric acid, adipic acid, pimelic acid, suberic acid, azelaic acid, sebacic acid, undecanedicarboxylic acid, dodecanedicarboxylic acid, hexadecadicarboxylic acid, hexadecenedicarboxylic acid, octadecadicarboxylic acid, octadecenedicarboxylic acid, eicosanedicarboxylic acid, eicosenedicarboxylic acid, docosanedicarboxylic acid, diglycolic acid and 2,2,4/2,4,4-trimethyladipic acid; an alicyclic dicarboxylic acid such as 1,4-cyclohexanedicarboxylic acid and norbornanedicarboxylic acid; an aromatic dicarboxylic acid such as terephthalic acid, isophthalic acid, phthalic acid, meta-xylylenedicarboxylic acid, para-xylylenedicarboxylic acid and 1,4/2,6/2,7-naphthalenedicarboxylic acid; and a tricarboxylic acid such as 1,2,4-butanetricarboxylic acid, 1,3,5-pentanetricarboxylic acid, 1,2,6/1,3,6-hexanetricarboxylic acid, 1,3,5-cyclohexanetricarboxylic acid and trimesic acid.

The amount of the amines added is appropriately determined by a known method in view of the terminal amino group concentration, terminal carboxyl group concentration and relative viscosity of the (D) terminal modified polyamide intended to produce. Usually, the amount of amines added is preferably from 0.5 to 20 meq/mol based on the polyamide raw material such as lactam, aminocarboxylic acid or nylon salt (per mol of the monomer or monomer unit constituting the repeating unit), and the amines is added at a ratio of 1.0 to 10 meq/mol (as for the equivalent of the amino group, the amount of amino group which reacts with a carboxyl group at 1:1 to form an amide group is defined as one equivalent). If this amount is less than the value above, a sufficiently high interlayer adhesion may not be obtained, whereas if the amount added exceeds the value above, production of a polyamide having a desired viscosity sometimes becomes difficult.

In the (D) terminal modified polyamide, in order to satisfy the condition of the terminal group concentrations, a diamine out of the above-described amines is preferably added at the polymerization and from the standpoint of suppressing the generation of gel, the diamine is preferably at least one member selected from the group consisting of aliphatic diamines and alicyclic diamines.

The relative viscosity of the (D) terminal modified polyamide as measured according to JIS K-6920 is preferably from 2.0 to 4.5, more preferably from 2.5 to 4.0. If the relative value is less than this value, the multilayer tube obtained may have insufficient mechanical properties, whereas if it exceeds the value above, the extrusion pressure or torque becomes excessively high and this sometimes makes it difficult to produce a multilayer tube.

Also, as long as the above-described terminal group concentrations are satisfied, the (D) terminal modified polyamide may be a mixture of two or more kinds of polyamides differing in the terminal group concentration. In this case, the terminal amino group concentration and terminal carboxyl group concentration of the polyamide mixture are determined by the terminal amino group concentration and terminal carboxyl group concentration of each of the polyamides constituting the mixture and by the blending ratio of these polyamides.

The (D) terminal modified polyamide may be a mixture with other polyamides or other thermoplastic resins. The content of the terminal modified polyamide in the mixture is preferably 60 wt % or more, more preferably 80 wt % or more. Examples of the other resin are the same as those of the other resin in the case of the (A) polyamide 11 and/or polyamide 12. Furthermore, the terminal modified polymer may also be a mixture with the (A) polyamide 11 and/or polyamide 12 or (B) semi-aromatic polyamide for use in the present invention.

In the (D) terminal modified polyamide, an antioxidant, a heat stabilizer, an ultraviolet absorbent, a light stabilizer, a lubricant, an inorganic filler, an antistatic agent, a flame retardant, a crystallization accelerator, an impact resistance improver and the like may be further added, if desired. In particular, similarly to the (A) polyamide 11 and/or polyamide 12, an impact resistance improver is preferably added for the purpose of improving the impact resistance.

The multilayer tube comprises at least three or more layers including a layer (a) comprising (A) polyamide 11 and/or polyamide 12, a layer (b) comprising (B) a semi-aromatic polyamide, and a layer (c) comprising (C) a fluorine-containing polymer having introduced into the molecular chain thereof a functional group having reactivity with a polyamide-based resin ((C) a fluorine-containing polymer).

In one aspect, the multilayer tube comprises at least four or more layers including a layer (a) comprising (A) polyamide 11 and/or polyamide 12, a layer (b) comprising (B) a semi-aromatic polyamide, a layer (c) comprising (C) a fluorine-containing polymer, and a layer (d) comprising (D) a terminal modified polyamide.

In another aspect, the layer (a) comprising (A) polyamide 11 and/or polyamide 12 is disposed as an outermost layer. When the layer comprising (A) polyamide 11 and/or polyamide 12 is disposed as an outermost layer, there occurs no environmental stress cracking due to an anti-freezing agent or the like.

In the multilayer tube, a layer (b) comprising (B) a semi-aromatic polyamide must be contained, and this layer is preferably disposed between the layer (a) comprising (A) polyamide 11 and/or polyamide 12 and the layer (c) comprising (C) a fluorine-containing polymer. The multilayer tube containing a layer (b) comprising (B) a semi-aromatic polyamide is excellent in the alcohol gasoline permeation-preventing property, particularly, hydrocarbon permeation-preventing property. Also, the multilayer tube containing a layer (c) comprising (C) a fluorine-containing polymer is assured of excellent alcohol gasoline permeation-preventing property.

The multilayer tube preferably contains a layer (d) comprising (D) a terminal modified polyamide, and this layer is preferably disposed between the layer (b) comprising (B) a semi-aromatic polyamide and the layer (c) comprising (C) a fluorine-containing polymer of the multilayer tube. By virtue of containing a layer (d) comprising (D) a terminal modified polyamide, excellent interlayer adhesion to the layer (c) comprising (C) a fluorine-containing polymer, particularly, excellent fuel resistance of interlayer adhesive strength, and over a long time, is ensured.

Also, in the multilayer tube, when an electrically conducting layer comprising a fluorine-containing polymer composition having incorporated thereinto an electrically conducting filler is disposed as an innermost layer of the multilayer tube, not only the chemical resistance and alcohol gasoline permeation-preventing property are excellent but also when used as a fuel piping tube or the like, sparking from the static electricity built-up due to internal friction of fuel circulating in the piping or due to friction between the fuel and the piping wall can be prevented. At this time, when a layer comprising a fluorine-containing polymer not having electrical conductivity is disposed outside the electrically conducting layer, both low-temperature impact resistance and electrical conductivity can be satisfied and this is also advantageous in view of profitability. The fluorine-containing polymer as used herein includes the (C) fluorine-containing polymer having a functional group in the molecular chain, which is specified in the present invention, and also includes a fluorine-containing polymer not having a functional group, which is described later.

When, for example, a flammable fluid such as gasoline is continuously contacted with an insulating material such as resin, static electricity may be accumulated to generate a spark, causing the fuel to catch fire. The electrical conductivity means an electrical property to such an extent that this static electricity is not accumulated. By virtue of this property, sparking from static electricity built-up at the transportation of a fluid such as fuel can be prevented.

The electrically conducting filler as used herein includes all fillers added for imparting electrically conducting performance to a resin and includes, for example, particulate, flaked or fibrous fillers.

Examples of the particulate filler include carbon black and graphite. Examples of the flaked filler include aluminum flake, nickel flake and nickel-coated mica. Examples of the fibrous filler include carbon nanotube, carbon nanofiber, carbon fiber, carbon-coated ceramic fiber, carbon whisker and metal fiber such as aluminum fiber, copper fiber, brass fiber and stainless steel fiber. Among these, carbon black is preferred.

The carbon black includes all carbon blacks generally used for imparting electrical conductivity. Preferred examples of the carbon black include, but are not limited to, acetylene black obtained by incomplete combustion of acetylene gas, Ketjen black produced by furnace-type incomplete combustion starting from a crude oil, oil black, naphthalene black, thermal black, lamp black, channel black, roll black and disk black.

As for the carbon black, various carbon powders differing in the properties such as particle size, surface area, DBP absorption and ash content are being produced. The carbon black is not particularly limited in its properties, but those having a good chain structure and a large aggregation density are preferred. In view of impact resistance, the carbon black is preferably not blended in a large amount. For obtaining excellent electrical conductivity with a smaller amount, the average particle size of the carbon black is preferably 500 nm or less, more preferably from 5 to 100 nm, still more preferably from 10 to 70 nm, the surface area (by BET method) is preferably 10 $m^2/g$ or more, more preferably 300 $m^2/g$ or more, still more preferably from 500 to 1,500 $m^2/g$, and the DBP (dibutyl phthalate) absorption is preferably 50 ml/100 g or more, more preferably 100 ml/100 g or more, still more preferably 300 ml/100 g or more. The ash content of the carbon black is preferably 0.5 wt % or less, more preferably 0.3 wt % or less. The DBP absorption as used herein means a value measured by the method prescribed in ASTM D-2414. A carbon black having a volatile content of less than 1.0 wt % is more preferred.

The electrically conducting filler may be surface-treated with a surface-treating agent such as a titanate-type, an aluminum-type or a silane-type surface-treating agent. Also, an electrically conducting filler after pelletization may be used so as to enhance the melt kneading workability.

The blending amount of the electrically conducting filler varies depending on the kind of electrically conducting filler used and cannot be indiscriminately specified, but in view of the balance of electrical conductivity with flowability, mechanical strength and the like, the electrically conducting filler in general is preferably blended in an amount of 3 to 30 parts by weight per 100 parts by weight of the (C) fluorine-containing polymer component.

For the purpose of obtaining a sufficiently high antistatic performance, the electrically conducting filler preferably ensures that the processed article obtained by melt-extruding a fluorine-containing polymer composition containing the electrically conducting filler has a surface resistivity of $10^8$ Ω/square or less, more preferably $10^6$ Ω/square or less. However, the blending of the electrically conducting filler is liable to incur lowering of mechanical strength and flowability and, therefore, if the objective electrical conductivity level can be achieved, the blending amount of the electrically conducting filler is preferably reduced as much as possible.

The thickness of each layer is not particularly limited and can be controlled according to the kind of the polymer constituting each layer, the number of layers in the entire multi-layer tube, the usage or the like. However, the thickness of each layer is determined by taking into account the properties of the multilayer tube, such as alcohol gasoline permeation-preventing property, low-temperature impact resistance and flexibility. In general, the thickness of each of the layers (a), (b) and (c) and the layer (d) which is disposed if desired, is preferably from 3 to 90% of the entire thickness of the multilayer tube and, in view of alcohol gasoline permeation-preventing property, the thickness of each of the layers (b) and (c) is preferably from 5 to 80%, more preferably from 10 to 50%, of the entire thickness of the multilayer tube.

The number of layers in the entire multilayer tube is not particularly limited as long as the multilayer tube comprises at least three layers including a layer (a) comprising (A) polyamide 11 and/or polyamide 12, a layer (b) comprising (B) a semi-aromatic polyamide, and a layer (c) comprising (C) a fluorine-containing polymer, preferably at least four layers including a layer comprising (A) polyamide 11 and/or polyamide 12, a layer comprising (B) a semi-aromatic polyamide, a layer (c) comprising (C) a fluorine-containing polymer, and a layer (d) comprising (D) a terminal modified polyamide. In addition to these four layers (a), (b), (c) and (d), the multilayer tube may further have one layer or two or more layers comprising other thermoplastic resins so as to impart more functions or to obtain a profitably advantageous multilayer tube.

Figure 2:
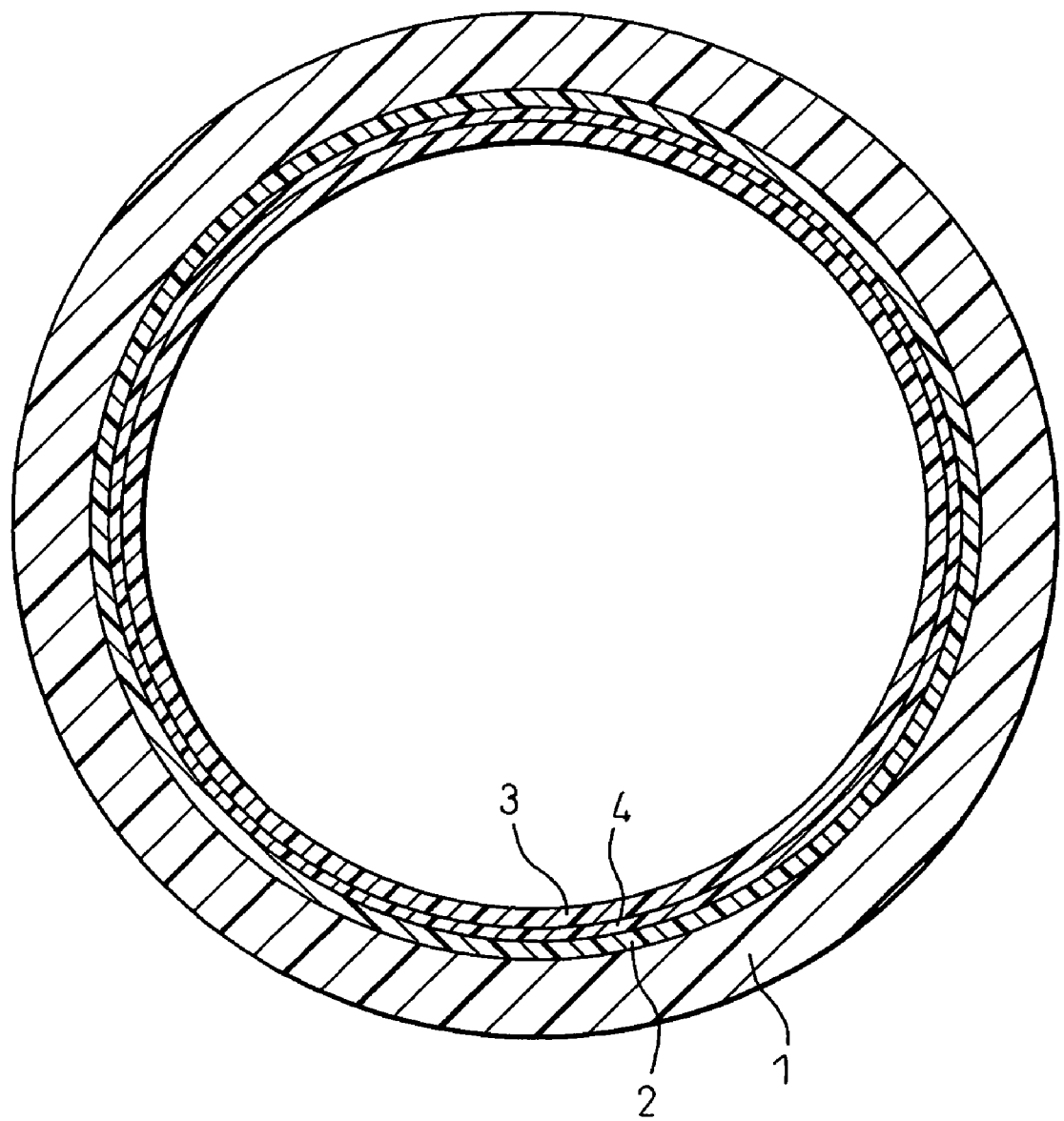
FIG. 2 is a transverse cross-sectional view of a multilayer tube of another Example.
Figure 3:
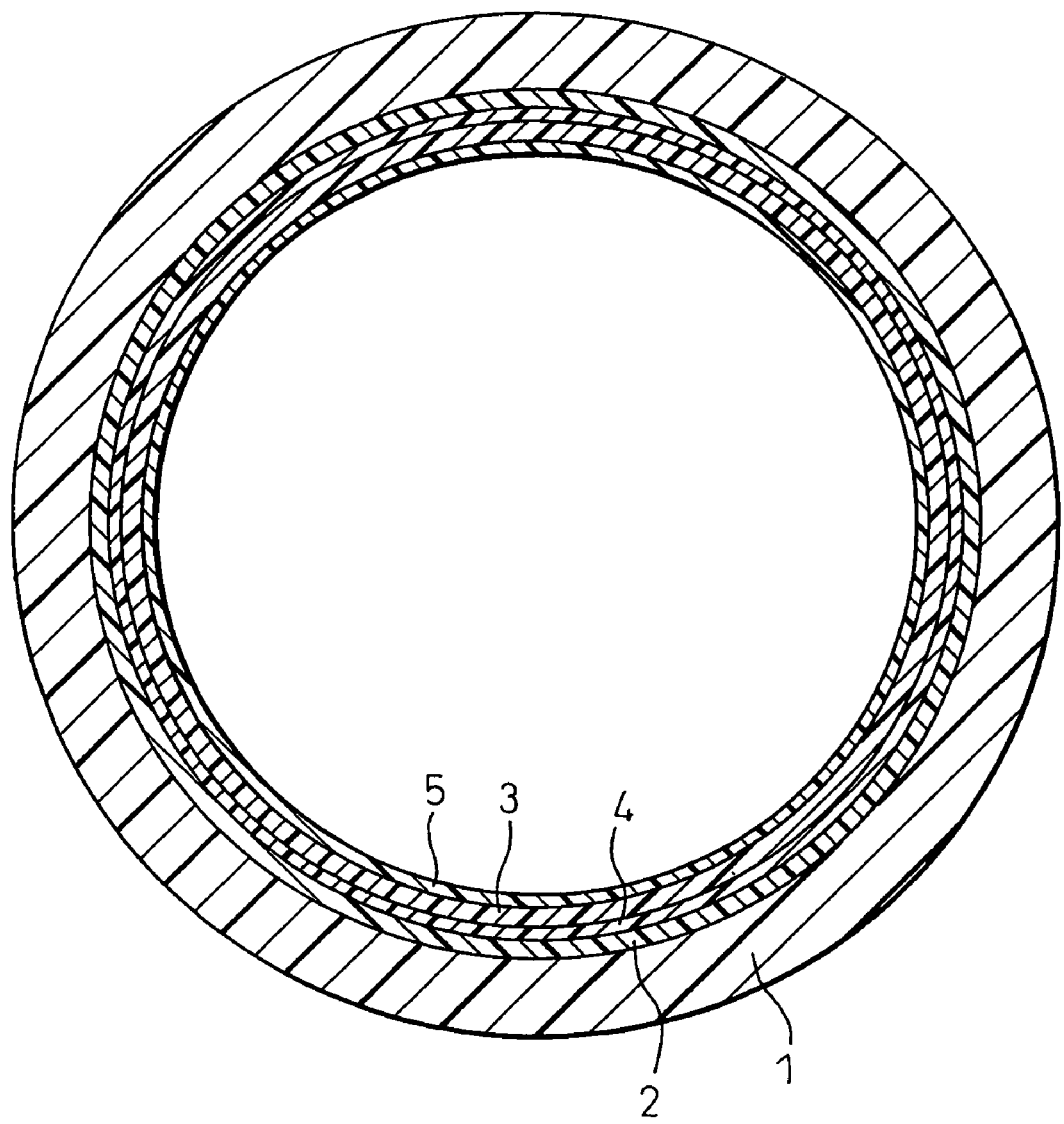
FIG. 3 is a transverse cross-sectional view of a multilayer tube of still another Example.

FIGS. 1 to 3 show suitable structure examples of the multilayer tube. In the constitution of FIG. 1, the outermost layer 1 is a layer (a) comprising (A) polyamide 11 and/or polyamide 12, the intermediate layer 2 is a layer (b) comprising (B) a semi-aromatic polyamide, the innermost layer 3 is a layer (c) comprising (C) a fluorine-containing polymer. In the constitution of FIG. 2, similarly to FIG. 1, the outermost layer 1 is a layer (a) comprising (A) polyamide 11 and/or polyamide 12, the intermediate layer 2 is a layer (b) comprising (B) a semi-aromatic polyamide, the innermost layer 3 is a layer (c) comprising (C) a fluorine-containing polymer, but in this example, a layer (d) comprising (D) a terminal modified polyamide is disposed as an inner layer 4 between the intermediate layer 2 and the innermost layer 3. The inner layer 4 may be disposed between the outermost layer 1 and the intermediate layer 2. In the constitution of FIG. 3, similarly to FIG. 2, the outermost layer 1 is a layer (a) comprising (A) polyamide 11 and/or polyamide 12, the intermediate layer 2 is a layer (b) comprising (B) a semi-aromatic polyamide, the inner layer 4 is a layer (d) comprising (D) a terminal modified polyamide, and the innermost layer 3 is a layer (c) comprising (c) a fluorine-containing polymer, but in this example, an electrically conducting layer 5 comprising a fluorine-containing polymer composition having incorporated thereinto an electrically conducting filler is further disposed inside the innermost layer 3.

The other thermoplastic resin includes a polyamide-based resin except for those specified herein (here, the resin except for those specified herein indicates a polyamide-based resin except for (A) polyamide 11 and/or polyamide 12, (B) a polyamide (semi-aromatic polyamide) comprising a dicarboxylic acid unit containing a terephthalic acid and/or naphthalenedicarboxylic acid unit in a proportion of 50 mol % or more based on all dicarboxylic acid units, and a diamine unit containing an aliphatic diamine unit having a carbon number of 9 to 13 in a proportion of 60 mol % or more based on all diamine units, and (D) a terminal modified polyamide satisfying a specific condition of terminal group concentrations), and examples thereof include polycaproamide (polyamide 6), polyethylene adipamide (polyamide 26), polytetramethylene adipamide (polyamide 46), polyhexamethylene adipamide (polyamide 66), polyhexamethylene azelamide (polyamide 69), polyhexamethylene sebacamide (polyamide 610), polyhexamethylene undecamide (polyamide 611), polyhexamethylene dodecamide (polyamide 612), polyhexamethylene terephthalamide (polyamide 6T), polyhexamethylene isophthalamide (polyamide 6I), polynonamethylene dodecamide (polyamide 912), polydecamethylene dodecamide (polyamide 1012), polydodecamethylene dodecamide (polyamide 1212), polymetaxylylene adipamide (polyamide MXD6), polybis(4-aminocyclohexyl)methane dodecamide (polyamide PACM12), polybis(3-methyl-4-aminocyclohexyl) methane dodecamide (polyamidedimethyl PACM12), polynonamethylene isophthalamide (polyamide 9I), polynonamethylene hexahydroterephthalamide (polyamide 9T(H)), polydecamethylene isophthalamide (polyamide 10I), polydecamethylene hexahydroterephthalamide (polyamide 10T(H)), polyundecamethylene isophthalamide (polyamide 11I), polyundecamethylene hexahydroterephthalamide (polyamide 11T(H)), polydodecamethylene isophthalamide (polyamide 12I), polydodecamethylene hexahydroterephthalamide (polyamide 12T(H)), and a copolymer using several kinds of raw material monomers of these polyamides.

Also, the other thermoplastic resin includes a fluorine-containing polymer except for that specified herein (here, the fluorine-containing polymer except for that specified herein indicates a fluorine-containing polymer not having a functional group), and examples thereof include polyvinylidene fluoride (PVDF), polyvinyl fluoride (PVF), an ethylene/tetrafluoroethylene copolymer (ETFE), polychlorotrifluoroethylene (PCTFE), an ethylene/chlorotrifluoroethylene copolymer (ECTFE), a tetrafluoroethylene/hexafluoropropylene copolymer (TFE/HFP, FEP), a tetrafluoroethylene/hexafluoropropylene/vinylidene fluoride copolymer (TFE/HFP/VDF, THV) and a tetrafluoroethylene/fluoro(alkyl vinyl ether) copolymer (PFA).

Examples of the other thermoplastic resin further include a polyolefin-based resin such as high-density polyethylene (HDPE), low-density polyethylene (LDPE), ultrahigh molecular weight polyethylene (UHMWPE), polypropylene (PP), ethylene/propylene copolymer (EPR), ethylene/butene copolymer (EBR), ethylene/vinyl acetate copolymer (EVA), ethylene/vinyl acetate copolymer saponification product (EVOH), ethylene/acrylic acid copolymer (EAA), ethylene/methacrylic acid copolymer (EMAA), ethylene/methyl acrylate copolymer (EMA), ethylene/methyl methacrylate copolymer (EMMA) and ethylene/ethyl acrylate copolymer (EEA); the above-described polyolefin-based resin having incorporated thereinto a functional group such as carboxyl group (e.g., acrylic acid, methacrylic acid, maleic acid, fumaric acid, itaconic acid, crotonic acid, mesaconic acid, citraconic acid, glutaconic acid, cis-4-cyclohexene-1,2-dicarboxylic acid, endobicyclo-[2.2.1]-5-heptene-2,3-dicarboxylic acid), its metal salt (Na, Zn, K, Ca, Mg), acid anhydride group (e.g., malic anhydride, itaconic anhydride, citraconic anhydride, endobicyclo-[2.2.1]-5-heptene-2,3-dicarboxylic anhydride) and epoxy group (e.g., glycidyl acrylate, glycidyl methacrylate, glycidyl ethacrylate, glycidyl itaconate, glycidyl citraconate); a polyester-based resin such as polybutylene terephthalate (PBT), polyethylene terephthalate (PET), polyethylene isophthalate (PEI), PET/PEI copolymer, polyarylate (PAR), polybutylene naphthalate (PBN), polyethylene naphthalate (PEN) and liquid crystal polyester (LCP); a polyether-based resin such as polyacetal (POM) and polyphenylene oxide (PPO); a polysulfone-based resin such as polysulfone (PSF) and polyether sulfone (PES); a polythioether-based resin such as polyphenylene sulfide (PPS) and polythioethersulfone (PTES); a polyketone-based resin such as polyether ether ketone (PEEK) and polyallyl ether ketone (PAEK); a polynitrile-based resin such as polyacrylonitrile (PAN), polymethacrylonitrile, acrylonitrile/styrene copolymer (AS), methacrylonitrile/styrene copolymer, acrylonitrile/butadiene/styrene copolymer (ABS) and methacrylonitrile/styrene/butadiene copolymer (MBS); a polymethacrylate-based resin such as polymethyl methacrylate (PMMA) and polyethyl methacrylate (PEMA); a polyvinyl ester-based resin such as polyvinyl acetate (PVAc); a polyvinyl chloride-based resin such as polyvinylidene chloride (PVDC), polyvinyl chloride (PVC), vinyl chloride/vinylidene chloride copolymer and vinylidene chloride/methyl acrylate copolymer; a cellulose-based resin such as cellulose acetate and cellulose butyrate; a polycarbonate-based resin such as polycarbonate (PC); a polyimide-based resin such as thermoplastic polyimide (PI), polyamideimide (PAI) and polyether imide; a thermoplastic polyurethane-based resin; a polyurethane elastomer; a polyester elastomer; and a polyamide elastomer.

Incidentally, as the multilayer tube is assured of excellent interlayer adhesion, a modified polyolefin-based resin which is usually disposed as an adhesive layer need not be used and among those thermoplastic resins, preferred are a polyester-based resin, a polyamide-based resin, a polythioether-based resin and a fluorine-containing polymer each having a melting point of 165° C. or more. Here, the melting point is defined as a temperature at a peak value in a melting curve measured by means of a differential scanning calorimeter by heating a sample at a temperature higher than the expected melting point, cooling the sample to 30° C. at a rate of 10° C./min and after keeping this state for about 1 minute, elevating the temperature at a rate of 10° C./min.

Furthermore, an arbitrary base material other than the thermoplastic resin, such as paper, a metal-based material, an unstretched or uniaxially or biaxially stretched plastic film or sheet, a woven fabric, a non-woven fabric, a metal cotton and wood material, may also be laminated. Examples of the metal-based material include a metal or metal compound such as aluminum, iron, copper, nickel, gold, silver, titanium, molybdenum, magnesium, manganese, lead, tin, chromium, beryllium, tungsten and cobalt, and alloys comprising two or more species thereof, such as alloy steel (e.g., stainless steel), aluminum alloy, copper alloy (e.g., brass, bronze) and nickel alloy.

The number of layers in the multilayer tube is 3 or more, but in view of mechanism of the tube producing apparatus, the number of layers is preferably 8 or less, more preferably from 4 to 7, still more preferably from 4 to 6.

Examples of the method for producing the multilayer tube include a method of melt-extruding the materials by using extruders corresponding to the number of layers or number of materials and simultaneously laminating the layers in the inside or outside of the die (coextrusion method), and a method of once producing a single-layer tube or previously producing a multilayer tube by the above-described method and then sequentially integrating and laminating the resins on the outer side of the tube by using, if desired, an adhesive (a coating method).

In the case where the obtained multilayer tube has a complicated shape or is formed into a processed article by applying heat bending after the molding, the objective processed article may also be obtained by heat-treating the formed multilayer tube at a temperature lower than the lowest melting point among melting points of the resins constituting the tube for 0.01 to 10 hours so as to remove the residual strain in the processed article.

The multilayer tube may have an undulation region. The undulation region means a region formed to have a shape of wave, bellows, accordion, corrugation or the like. The undulation region may be provided over the entire length of the multilayer tube or may be partially provided in an appropriate middle portion. The undulated region can be easily formed by shaping a straight tube and subsequently mold-processing it to have a predetermined undulated shape or the like. By virtue of having such an undulated region, an impact-absorbing property is imparted and the fixing operation is facilitated. Furthermore, for example, necessary parts such as connector may be attached or formation into L-shape, U-shape or the like may be attained by bending.

By taking account of pebbling, abrasion with other parts and flame resistance, the outer circumference of the thus-processed multilayer tube may be entirely or partially provided with a solid or sponge-like protective member (protector) formed of epichlorohydrin rubber (ECO), acrylonitrile/butadiene rubber (NBR), an NBR and polyvinyl chloride mixture, chlorosulfonated polyethylene rubber, chlorinated polyethylene rubber, acrylic rubber (ACM), chloroprene rubber (CR), ethylene/propylene rubber (EPR), ethylene/propylene/diene rubber (EPDM), an NBR and EPDM mixture rubber, or a thermoplastic elastomer such as vinyl chloride type, olefin type, ester type and amide type. The protective member may be formed as a sponge-like porous material by a known method. By forming as a porous material, a lightweight and highly adiabatic protective part can be provided. Also, the material cost can be reduced. Alternatively, the strength of the protective member may be improved by adding glass fiber or the like. The shape of the protective member is not particularly limited, but a cylindrical member or a block member having a recess for receiving the multilayer tube is usually used. In the case of a cylindrical member, the multilayer tube is inserted into a previously prepared cylindrical member, or a cylindrical member is coated by extrusion on the multilayer tube, thereby tightly contacting the cylindrical member and the multilayer tube. For bonding the protective member and the multilayer tube, an adhesive is coated, if desired, on the inner surface or recess surface of the protective member and the multilayer tube is inserted or fitted thereinto to tightly contact these with each other, thereby forming a structure where the multilayer tube and the protective member are integrated. Also, reinforcement by a metal or the like may be applied.

The outer diameter of the multilayer tube is not limited but in view of flow rate of the fuel (for example, gasoline), the multilayer tube is designed to have a wall thickness capable of not increasing gasoline permeability, capable of maintaining the burst pressure at a level of a normal tube, and capable of maintaining flexibility to such an extent that the tube can be easily fixed and good vibration resistance is ensured in use. Preferably, the outer diameter is from 4 to 30 mm, the inner diameter is from 3 to 25 mm, and the wall thickness is from 0.5 to 5 mm.

EXAMPLES

Selected, representative aspects of the invention is described in greater detail below by referring to Examples and Comparative Examples. However, the Examples do not limit the scope of this disclosure.

In Examples and Comparative Examples, the analysis and measurement of physical properties were performed as follows.

The characteristic properties of the polyamide-based resin were measured by the following method.
[Relative Viscosity]

The relative viscosity was measured according to JIS K-6920 in 96% sulfuric acid under the conditions that the polyamide concentration was 1% and the temperature was 25° C.
[Terminal Carboxyl Group Concentration]

A polyamide sample in a predetermined amount was charged into a three-neck Kjeldahl flask and after adding 40 mL of benzyl alcohol, the flask was immersed in an oil bath set at 180° C. under nitrogen. The sample was dissolved by stirring with a stirring motor attached to the top part, and titration was performed with an N/20 sodium hydroxide solution by using phenol phthalein as the indicator, whereby the terminal carboxyl group concentration was determined.
[Terminal Amino Group Concentration]

A polyamide sample in a predetermined amount was charged into an Erlenmeyer flask with a stopper cock, and 40 mL of a previously prepared solvent of phenol/methanol (volume ratio: 9/1) was added thereto. Thereafter, the sample was dissolved by stirring with a magnet stirrer, and titration was performed with N/20 hydrochloric acid by using thymol blue as the indicator, whereby the terminal amino group concentration was determined.

The characteristic properties of the fluorine-containing polymer were measured by the following methods.
[Composition of Fluorine-Containing Polymer]

The composition was measured by a melt NMR analysis and a fluorine content analysis.
[Carboxyl Group Content in Fluorine-Containing Polymer]

As for the content of the polymerized unit based on itaconic anhydride (IAN), as the absorption peak by stretching vibration of C=O in any polymerized unit appears at 1,870 $cm^{-1}$, the absorbance at the absorption peak was measured, and the content M (mol %) of the polymerized unit based on IAN was determined by using the relational expression of M=aL. Here, L is the absorbance at 1,870 $cm^{-1}$, and a is a coefficient. As for the coefficient a, a=0.87, as determined by using LAN as a model compound, was used.
[Number of Terminal Carbonate Groups in Fluorine-Containing Polymer]

As for the number of terminal carbonate groups in the fluorine-containing polymer, as the peak assigned to the carbonyl group of a carbonate group (—OC(=O)O—) appears at the absorption wavelength of 1,809 $cm^{-1}$ by an infrared absorption spectrum analysis, the absorbance at the absorption peak was measured, and the number of carbonate groups per the main-chain carbon number of $10^6$ in the fluorine-containing polymer was calculated according to the following formula:

[Number of carbonate groups per main-chain carbon number of $10^6$ in fluorine-containing polymer]= $500AW/\epsilon df$ A: the absorbance at the peak of the carbonate group (—OC(=O)O—), $\epsilon$: the molar absorbance coefficient [$cm^{-1} \cdot mol^{-1}$] of the carbonate group (—OC(=O)O—); $\epsilon$=170 determined by using a model compound was employed, W: the composition average molecular weight calculated from the monomer composition, d: the film density [$g/cm^3$], and f: the film thickness [mm].

The physical properties of the multilayer tube were measured by the following methods.
[Low-Temperature Impact Resistance]

This was evaluated by the method described in SAE J-2260 7.5.
[Alcohol-Containing Gasoline Permeation-Preventing Property]

One end of the tube cut into 200 mm was plugged, alcohol/gasoline obtained by mixing Fuel C (isooctane/toluene=50/50 by volume) and ethanol at a volume ratio of 90/10 was charged into the inside, and the other end was also plugged. Thereafter, the entire weight was measured, then the test tube was placed in an oven at 60° C., and the change in weight was measured every day. The alcohol-containing gasoline permeation coefficient ($g/m^2 \cdot day$) was calculated by dividing the change in weight per day by the inner layer surface area per m of the tube.
[Interlayer Adhesion]

The tube cut to 200 mm was further cut into a half in the longitudinal direction to prepare a test piece. The test piece was subjected to a 180° peel test at a peeling speed of 50 mm/min by using a Tensilon universal tester. The peel strength (interlayer adhesive strength) was read from the peak of S—S curve and the interlayer adhesion was evaluated.
[Fuel Resistance of Interlayer Adhesive Strength]

The multilayer tube cut to a length of 200 mm was used as a sample. In this sample, alcohol/gasoline obtained by mixing Fuel C (isooctane/toluene=50/50 by volume) and methanol at a volume ratio of 85/15 was enclosed. After closely sealing both ends, the sample was set in a constant temperature chamber at 60° C. and kept for 1,000 hours. Thereafter, the enclosed matter was completely removed, the tube was dried, the interlayer adhesive strength was measured by the above-described method, and the fuel resistance of interlayer adhesive strength was evaluated.
[Sour Gasoline Resistance (Chemical Resistance)]

The sour gasoline resistance test was performed by the method described in SAE J-2260 7.8. The low-temperature impact resistance of the tube after the test was evaluated by the above-described method, and when the number of ruptured tubes in 10 tested tubes was 0, the sour gasoline resistance (chemical resistance) was judged to be excellent.
[Heat Resistance]

A heat treatment was performed according to VOLKSWAGEN AG TL-52435 3.5. The impact resistance at 23° C. of the tube after heat treatment was evaluated by the measurement method according to VOLKSWAGEN AG PV-3905 and when the number of ruptured tubes in 10 tested tubes was 0, the heat resistance was judged to be good.
[Materials Used in Examples and Comparative Examples]
(A) Polyamide 12
(A-1) Production of Polyamide 12 Resin Composition A maleic anhydride-modified ethylene/propylene copolymer (JSR T7712SP, produced by JSR corporation) as an impact resistance improver was previously mixed with polyamide 12 (UBESTA3030U, produced by Ube Industries, Ltd., relative viscosity: 2.27). While supplying the mixture to a twin-screw melt-kneading machine (manufactured by Japan Steel Works, Ltd., model: TEX44), benzenesulfonic acid butylamide as a plasticizer was fed by a quantitative pump in the middle of the cylinder of the twin-screw melt-kneading machine and melt-kneaded at a cylinder temperature of 180 to 260° C. The resulting resin melt was extruded as a strand, introduced into a water tank, cooled, cut and then vacuum-dried to obtain pellets of a polyamide 12 resin composition comprising 85 wt % of polyamide 12 resin, 10 wt % of impact resistance improver and 5 wt % of plasticizer (hereinafter, this polyamide resin composition is referred to as (A-1)).

(B) Semi-Aromatic Polyamide (B-1) Production of Semi-Aromatic Polyamide

Into an autoclave, 32,927 g (198.2 mol) of terephthalic acid, 15,829 g (100 mol) of 1,9-nonanediamine, 15,829 g (100 mol) of 2-methyl-1,8-octanediamine, 439.6 g (3.6 mol) of benzoic acid, 60 g of sodium hypophosphite monohydrate (0.1 wt % based on raw material) and 40 L of distilled water were charged. Then, the interior of the autoclave was purged with nitrogen.

The contents were stirred at 100° C. for 30 minutes and the internal temperature was elevated to 210° C. over 2 hours. At this time, the pressure within the autoclave was increased to 2.2 MPa. After continuing the reaction in this state for 1 hour, the temperature was elevated to 230° C., and the temperature was then kept at 230° C. for 2 hours to allow the reaction to proceed while keeping the pressure at 2.2 MPa by gradually extracting the water vapor. Subsequently, the pressure was reduced to 1 MPa over 30 minutes, and the reaction was further allowed to proceed for 1 hour to obtain a prepolymer. This prepolymer was dried at 100° C. for 12 hours under reduced pressure, ground to a size of 2 mm or less and then subjected to solid phase polymerization at 230° C. under 0.013 kPa for 10 hours to obtain a semi-aromatic polyamide having a melting point of 265° C. and a relative viscosity of 2.80 (hereinafter this semi-aromatic polyamide is referred to as (B-1)).

(B-2) Production of Semi-Aromatic Polyamide

A semi-aromatic polyamide having a melting point of 275° C. and a relative viscosity of 2.40 (hereinafter this semi-aromatic polyamide is referred to as (B-2)) was obtained in the same manner as in (B-1) Production of Semi-Aromatic Polyamide except that in (B-1) Production of Semi-Aromatic Polyamide, 32,927 g (198.2 mol) of terephthalic acid was changed to 42,848 g (198.2 mol) of 2,6-naphthalenedicarboxylic acid.

(B-3) Production of Semi-Aromatic Polyamide

A semi-aromatic polyamide having a melting point of 301° C. and a relative viscosity of 2.55 (hereinafter this semi-aromatic polyamide is referred to as (B-3)) was obtained in the same manner as in (B-1) Production of Semi-Aromatic Polyamide except that in (B-1) Production of Semi-Aromatic Polyamide, 15,829 g (100 mol) of 1,9-nonanediamine and 15,829 g (100 mol) of 2-methyl-1,8-octanediamine were changed to 40,073 g (200 mol) of 1,12-dodecanediamine.

(B-4) Production of Semi-Aromatic Polyamide

A semi-aromatic polyamide having a melting point of 311° C. and a relative viscosity of 2.42 (hereinafter this semi-aromatic polyamide is referred to as (B-4)) was obtained in the same manner as in (B-3) Production of Semi-Aromatic Polyamide except that in (B-3) Production of Semi-Aromatic Polyamide, 32,927 g (198.2 mol) of terephthalic acid was changed to 42,848 g (198.2 mol) of 2,6-naphthalenedicarboxylic acid.

(B-5) Production of Semi-Aromatic Polyamide

Into an autoclave, 29,230 g (200 mol) of adipic acid, 27,376 g (201 mol) of m-xylylenediamine, 122.1 g (1.0 mol) of benzoic acid, 57 g of sodium hypophosphite monohydrate (0.1 wt % based on raw material) and 40 L of distilled water were charged. Then, the interior of the autoclave was purged with nitrogen.

The contents were stirred at 100° C. for 30 minutes and the internal temperature was elevated to 220° C. over 2 hours. At this time, the pressure within the autoclave was increased to 1.9 MPa. After continuing the reaction in this state for 3 hours, the pressure was returned to atmospheric pressure over 1 hour and at the same time, the temperature was elevated to 265° C. When the internal temperature reached 265° C., the reduction of pressure was started and the reaction was allowed to proceed at 27 kPa for 2 hours. Thereafter, the above increased pressure was reestablished, and a polymer melt was withdrawn from the bottom of autoclave and then pelletized by cooling to obtain a semi-aromatic polyamide having a melting point of 237° C. and a relative viscosity of 2.42 (hereinafter this semi-aromatic polyamide is referred to as (B-5)).

(C) Fluorine-Containing Polymer (C-1) Production of Fluorine-Containing Polymer

A polymerization bath with a stirring blade having an inner volume of 94 L was deaerated, and 71.3 kg of 1-hydrotridecafluorohexane, 20.4 kg of 1,3-dichloro-1,1,2,2,3-pentafluoropropane (AK225cb, produced by Asahi Glass Co., Ltd.; hereinafter referred to as "AK225cb") as a chain transfer agent, 562 g of $CH_2=CH(CF_2)_2F$ and 4.45 g of itaconic anhydride (IAN) were charged thereinto. The temperature inside the polymerization bath was elevated to 66° C., and the pressure was increased to 1.5 MPa/G with a gas of TFE/E (molar ratio: 89/11). Thereafter, 1 L of a 0.7% hydrotridecafluorohexane solution of tert-butyl peroxypivalate was charged as a polymerization initiator and the polymerization was initiated.

A monomer mixed gas of TFE/E (molar ratio: 59.5/40.5) was continuously charged to keep constant the pressure during polymerization. Furthermore, $CH_2=CH(CF_2)_2F$ in an amount corresponding to 3.3 mol % and IAN in an amount corresponding to 0.8 mol %, based on the total molar number of TFE and E charged during polymerization, were continuously charged in the form of a 1% solution of AK225cb. After 9.9 hours from the initiation of polymerization and when 7.28 kg of the monomer mixed gas had been charged, the internal temperature of the polymerization bath was lowered to room temperature, and purging was performed to atmospheric pressure.

The obtained fluorine-containing polymer in a slurry form was charged into a 200-L granulation tank containing 77 kg of water and granulated by elevating the temperature to 105° C. with stirring while removing the solvent by distillation. The granulated material obtained was dried at 150° C. for 15 hours to obtain 6.9 kg of a granulated fluorine-containing polymer.

The composition of the fluorine-containing polymer was 57.2/38.5/0.48/3.5 in terms of the molar ratio of TFE-based polymerized unit/E-based polymerized unit/IAN-based polymerized unit/$CH_2=CH(CF_2)_2F$-based polymerized unit. The melting point was 230° C.

This granulated material was melted at 280° C. for a residence time of 2 minutes by using an extruder to obtain pellets of the fluorine-containing polymer (hereinafter, this fluorine-containing polymer is referred to as (C-1)).

(C-2) Production of Fluorine-Containing Polymer

A polymerization bath with a stirring blade having an inner volume of 94 L was deaerated, and 19.7 kg of ion exchanged water, 77.3 kg of 1-hydrotridecafluorohexane, 20.4 kg of AK225cb, 427 g of $CH_2=CH(CF_2)_2F$, 3.36 kg of tetrafluoroethylene (TFE) and 127 g of ethylene (E) were charged thereinto under pressure. The temperature inside the polymerization bath was elevated to 45° C. and, at this time, and the pressure was 0.65 MPa. Thereafter, 72 g of diisopropyl peroxydicarbonate was charged as a polymerization initiator and the polymerization was initiated.

A monomer mixed gas of TFE/E (molar ratio: 60/40) was continuously charged to keep constant the pressure during polymerization. Furthermore, $CH_2=CH(CF_2)_2F$ in an amount corresponding to 6.0 mol % based on the total molar number of TFE and E charged during polymerization was continuously charged. After 5.6 hours from the initiation of polymerization and when 11.5 kg of the monomer mixed gas was charged, the internal temperature of the polymerization bath was lowered to room temperature, and purging was performed to atmospheric pressure.

The obtained fluorine-containing polymer was charged into a 300-L granulation tank containing 100 kg of water and granulated by elevating the temperature to 105° C. with stirring while removing the solvent by distillation. The granulated material obtained was dried at 135° C. for 3 hours to obtain 12.1 kg of a granulated fluorine-containing polymer. This granulated material was melted at 270° C. for a residence time of 2 minutes by using an extruder to obtain pellets of the fluorine-containing polymer (hereinafter, this fluorine-containing polymer is referred to as (C-2)).

The composition of the fluorine-containing polymer was 57.2/37.0/6.0 in terms of the molar ratio of TFE-based polymerized unit/E-based polymerized unit/$CH_2=CH(CF_2)_2F$-based polymerized unit. The melting point was 204° C., and the number of carbonate terminal groups originated by the polymerization initiator was 672 per the main-chain carbon number of $10^6$ in the polymer.

(C-3) Production of Fluorine-Containing Polymer

A polymerization bath with a stirring blade having an inner volume of 94 L was deaerated, and 40 kg of ion exchanged water, 16 kg of 1-hydrotridecafluorohexane, 4 kg of hexafluoropropylene (HFP), 0.95 kg of tetrafluoroethylene (TFE) and 0.3 kg of vinylidene fluoride (VDF) were charged thereinto under pressure. The temperature inside the polymerization bath was elevated to 35° C. Thereafter, 250 g of diisopropyl peroxydicarbonate was charged as a polymerization initiator and the polymerization was initiated.

A monomer mixed gas of TFE/VDF/HFP (molar ratio: 50/40/10) was continuously fed to keep constant the pressure during polymerization, whereby the pressure in the system was kept constant. After 30 hours from the initiation of polymerization, the internal temperature of the polymerization bath was lowered to room temperature, and purging was performed to atmospheric pressure.

The obtained fluorine-containing polymer was charged into a 300-L granulation tank containing 100 kg of water and granulated by elevating the temperature to 105° C. with stirring while removing the solvent by distillation. The granulated material obtained was dried at 135° C. for 3 hours to obtain 10.0 kg of a granulated fluorine-containing polymer.

This granulated material was melted at 260° C. for a residence time of 2 minutes by using an extruder to prepare pellets of the fluorine-containing polymer (hereinafter, this fluorine-containing polymer is referred to as (C-3)).

The composition of the fluorine-containing polymer was 51.3/38.9/9.8 in terms of the molar ratio of TFE-based polymerized unit/VDF-based polymerized unit/HPF-based polymerized unit. The melting point was 170° C., and the number of carbonate terminal groups originated by the polymerization initiator was 311 per the main-chain carbon number of $10^6$ in the polymer.

(C-4) Production of Electrically Conducting Fluorine-Containing Polymer

100 Parts by mass of the fluorine-containing polymer (C-1) and 13 parts by mass of carbon black (produced by Denki Kagaku Kogyo K.K.) were previously mixed, and the mixture was fed to a twin-screw melt-kneading machine (manufactured by Toshiba Machine Co., Ltd., model: TEM-48SS) and melt-kneaded at a cylinder temperature of 240 to 300° C. The resulting resin melt was extruded as a strand, and the discharged strand was introduced into a water tank, cooled with water, cut by a pelletizer and then dried in a dryer at 120° C. for 10 hours to remove the water content, thereby obtaining pellets of an electrically conducting fluorine-containing polymer (hereinafter, this electrically conducting fluorine-containing polymer is referred to as (C-4)).

(C-5) Production of Fluorine-Containing Polymer

A granulated fluorine-containing polymer (7.0 kg) was obtained in the same manner as in (C-1) Production of Fluorine-Containing Polymer except that in (C-1) Production of Fluorine-Containing Polymer, IAN was not charged.

The composition of the fluorine-containing polymer was 57.6/38.7/3.7 in terms of the molar ratio of TFE-based polymerized unit/E-based polymerized unit/$CH_2=CH(CF_2)_2F$-based polymerized unit. The melting point was 232° C.

This granulated material was melted at 280° C. for a residence time of 2 minutes by using an extruder to prepare pellets of the fluorine-containing polymer (hereinafter, this fluorine-containing polymer is referred to as (C-5)).

(C-6) Production of Electrically Conducting Fluorine-Containing Polymer

100 Parts by mass of the fluorine-containing polymer (C-5) and 13 parts by mass of carbon black (produced by Denki Kagaku Kogyo K.K.) were previously mixed, and the mixture was fed to a twin-screw melt-kneading machine (manufactured by Toshiba Machine Co., Ltd., model: TEM-48SS) and melt-kneaded at a cylinder temperature of 240 to 300° C. The resulting resin melt was extruded as a strand, and the discharged strand was introduced into a water tank, cooled with water, cut by a pelletizer and then dried in a dryer at 120° C. for 10 hours to remove the water content, thereby obtaining pellets of an electrically conducting fluorine-containing polymer (hereinafter, this electrically conducting fluorine-containing polymer is referred to as (C-6)).

(D) Terminal Modified Polyamide (D-1) Production of Terminal Modified Polyamide 12

Into a 70-liter autoclave, 20 kg of dodecanelactam, 0.5 kg of water and 49.3 g (1/350 eq/mol dodecanelactam) of 5-amino-1,3,3-trimethylcyclohexanemethylamine (hereinafter referred to as "isophoronediamine") were charged. After purging the interior of the polymerization bath with nitrogen, the system was heated to 100° C., and the contents were stirred at this temperature to provide a uniform state in the reaction system. Subsequently, the temperature inside the polymerization bath was elevated to 260° C. and while controlling the pressure in the bath to 3.5 MPa, polymerization was performed for 2 hours with stirring. Thereafter, the pressure was allowed to decrease to atmospheric pressure over about 2 hours and then reduced to 53 kPa, and the polymerization was performed under reduced pressure for 4 hours. Furthermore, nitrogen was introduced into the autoclave and, after returning the pressure to atmospheric pressure, the polymer was withdrawn as a strand from a bottom nozzle of the reaction vessel and cut to obtain pellets. The pellets obtained were immersed in hot water to remove by extraction the unreacted monomer and then dried under reduced pressure. The obtained polymer had a relative viscosity of 2.26, a terminal amino group concentration of 47 µeq/g and a carboxyl group concentration of 20 µeq/g (hereinafter, this polyamide resin is referred to as (D-1)). Assuming that the terminal amino group concentration of the polyamide is [A] (µeq/g-polymer) and the terminal carboxyl group concentration is [B] (µeq/g-polymer), [A]>[B]+5 was satisfied.

(D-2) Production of Terminal Modified Polyamide 6

Into a 70-liter autoclave, 20 kg of caprolactam, 0.5 kg of water and 37.6 g (1/800 eq/mol caprolactam) of isophoronediamine were charged. After purging the interior of the polymerization bath with nitrogen, the system was heated to 100° C., and the contents were stirred at this temperature to provide a uniform state in the reaction system. Subsequently, the temperature inside the polymerization bath was elevated to 260° C. and, while controlling the pressure in the bath to 2.5 MPa, polymerization was performed for 2 hours with stirring. Thereafter, the pressure was allowed to decrease to atmospheric pressure over about 2 hours and then reduced to 53 kPa, and the polymerization was performed under reduced pressure for 4 hours. Furthermore, nitrogen was introduced into the autoclave and, after returning the pressure to atmospheric pressure, the polymer was withdrawn as a strand from a bottom nozzle of the reaction vessel and cut to obtain pellets. The pellets obtained were immersed in hot water to remove by extraction the unreacted monomer and then dried under reduced pressure. The obtained polymer had a relative viscosity of 3.36, a terminal amino group concentration of 55 µeq/g and a carboxyl group concentration of 35 µeq/g (hereinafter, this polyamide resin is referred to as (D-2)). Assuming that the terminal amino group concentration of the polyamide is [A] (µeq/g-polymer) and the terminal carboxyl group concentration is [B] (µeq/g-polymer), [A]>[B]+5 was satisfied.

(D-3) Production of Polyamide 12

A polymer was obtained in the same manner as in (D-1) Production of Terminal Modified Polyamide 12 except that in (D-1) Production of Terminal Modified Polyamide 12, 49.3 g (1/350 eq/mol dodecanelactam) of isophoronediamine was not used and the reduced pressure was changed from 53 kPa to 93 kPa. The obtained polymer had a relative viscosity of 2.26, a terminal amino group concentration of 32 µeq/g and a carboxyl group concentration of 35 µeq/g (hereinafter, this polyamide resin is referred to as (D-3)). Assuming that the terminal amino group concentration of the polyamide is [A] (µeq/g-polymer) and the terminal carboxyl group concentration is [B] (1 eq/g-polymer), the relationship therebetween was [A]<[B]+5.

(D-4) Production of Polyamide 6

A polymer was obtained in the same manner as in (D-2) Production of Terminal Modified Polyamide 6 except that in (D-2) Production of Terminal Modified Polyamide 6, 37.6 g (1/800 eq/mol caprolactam) of isophoronediamine was not used and the reduced pressure was changed from 53 kPa to 93 kPa. The obtained polymer had a relative viscosity of 3.35, a terminal amino group concentration of 41 µeq/g and a carboxyl group concentration of 42 µeq/g (hereinafter, this polyamide resin is referred to as (D-4)). Assuming that the terminal amino group concentration of the polyamide is [A] (µeq/g-polymer) and the terminal carboxyl group concentration is [B] (µeq/g-polymer), the relationship therebetween was [A]<[B]+5.

(E) Ethylene/Vinyl Acetate Copolymer Saponification Product (EVOH)

EVOH (E-1): Eval F101A produced by Kuraray Co., Ltd.

(F) Polybutylene Naphthalate (PBN)

PBN (F-1): Perprene EN-16000, produced by Toyobo Co., Ltd.

(G) Polyphenylene Sulfide (PPS)

PPS (G-1): Torelina A670X01, produced by Toray Industries (H) Adhesive Resin (H-1) Maleic anhydride-modified polyethylene, Ubond F1100, produced by UBE Industries, Ltd.

(H-2) Production of Adhesive Resin Composition (F) PBN (F-1) (Perprene EN-16000, produced by Toyobo Co., Ltd.) and an ethylene/glycidyl methacrylate copolymer (Rexpearl RA3150, produced by Japan Polyolefin Corp.) were previously mixed with (A) polyamide 12 (UBESTA3030U, produced by Ube Industries, Ltd., relative viscosity: 2.27), and the mixture was fed to a twin-screw melt-kneading machine (manufactured by Japan Steel Works, Ltd., model: TEX44) and melt-kneaded at a cylinder temperature of 180 to 260° C. The resulting resin melt was extruded as a strand, and this strand was introduced into a water tank, cooled, cut and then vacuum-dried to obtain pellets of an adhesive resin composition comprising polyamide 12/PBN/modified polyolefin=40/55/5 (by weight) (hereinafter, this adhesive resin composition is referred to as (H-2)).

(H-3) Production of Adhesive Resin Composition

Pellets of an adhesive resin composition comprising fluorine-containing polymer/PBN/modified polyolefin=40/55/5 (by weight) (hereinafter, this adhesive resin composition is referred to as (H-3)) were obtained in the same manner as in (H-2) Production of Adhesive Resin Composition except that in (H-2) Production of Adhesive Resin Composition, the (A) polyamide 12 (UBESTA3030U, produced by Ube Industries, Ltd., relative viscosity: 2.27) was changed to (C) fluorine-containing polymer (C-5) and the cylinder temperature was changed to 200 to 290° C.

(H-4) Production of Adhesive Resin Composition

Pellets of an adhesive resin composition comprising polyamide 12/PPS/modified polyolefin=40/55/5 (by weight) (hereinafter, this adhesive resin composition is referred to as (H-4)) were obtained in the same manner as in (H-2) Production of Adhesive Resin Composition except that in (H-2) Production of Adhesive Resin Composition, the (F) PBN (F-1) (Perprene EN-16000, produced by Toyobo Co., Ltd.) was changed to (G) PPS (G-1) (Torelina A670X01, produced by Toray Industries) and the cylinder temperature was changed to 200 to 290° C.

(H-5) Production of Adhesive Resin Composition

Pellets of an adhesive resin composition comprising PPS/fluorine-containing polymer/modified polyolefin=55/40/5 (by weight) (hereinafter, this adhesive resin composition is referred to as (H-5)) were obtained in the same manner as in (H-2) Production of Adhesive Resin Composition except that in (H-2) Production of Adhesive Resin Composition, the (A) polyamide 12 (UBESTA3030U, produced by Ube Industries, Ltd., relative viscosity: 2.27) and the (F) PBN (F-1) (Perprene EN-16000, produced by Toyobo Co., Ltd.) were changed to (G) PPS (G-1) (Torelina A670X01, produced by Toray Industries) and (C) fluorine-containing polymer (C-5), respectively, and the cylinder temperature was changed to 200 to 290° C.

Example 1

The above-described (A) polyamide 12 resin composition (A-1), (B) semi-aromatic polyamide (B-1), (C) fluorine-containing polymer (C-1) and (D) terminal modified polyamide (D-1) were separately melted by using a four-layer tube forming machine, Plabor, (manufactured by Plabor Co., Ltd.) at an extrusion temperature of 250° C. for (A), 300° C. for (B), 290° C. for (C) and 250° C. for (D), and the discharged resin melts were joined by means of an adapter and processed into a multilayer tubular form. Subsequently, the processed article was cooled by a sizing die capable of controlling the dimension and withdrawn to obtain a multilayer tube having an inner diameter of 6 mm and an outer diameter of 8 mm and having a layer structure of (a)/(b)/(d)/(c)=0.60/0.15/0.10/0.15 mm consisting of a layer (a) comprising the (A) polyamide 12 resin composition (outermost layer), a layer (b) comprising the (B) semi-aromatic polyamide composition (intermediate layer), a layer (d) comprising the (D) terminal modified polyamide (D-1) (inner layer) and a layer (c) comprising the (C) fluorine-containing polymer (C-1) (innermost layer). The physical properties of this multilayer tube were measured and the results obtained are shown in Table 1.

Example 2

A multilayer tube having a layer structure shown in Table 1 was obtained in the same manner as in Example 1 except that in Example 1, the (B) semi-aromatic polyamide (B-1) was changed to (B-2). The physical properties of this multilayer tube were measured and the results obtained are shown in Table 1.

Example 3

A multilayer tube having a layer structure shown in Table 1 was obtained in the same manner as in Example 2 except that in Example 2, the (C) fluorine-containing polymer (C-1) was changed to (C-2) and the (C) was melted at an extrusion temperature of 250° C. The physical properties of this multilayer tube were measured and the results obtained are shown in Table 1.

Example 4

A multilayer tube having a layer structure shown in Table 1 was obtained in the same manner as in Example 2 except that in Example 2, the (C) fluorine-containing polymer (C-1) was changed to (C-3) and the (C) was melted at an extrusion temperature of 230° C. The physical properties of this multilayer tube were measured and the results obtained are shown in Table 1.

Example 5

A multilayer tube having a layer structure shown in Table 1 was obtained in the same manner as in Example 2 except that in Example 2, the (C) fluorine-containing polymer (C-1) was changed to the electrically conducting fluorine-containing polymer (C-4) and the (C) was melted at an extrusion temperature of 300° C. The physical properties of this multilayer tube were measured and the results obtained are shown in Table 1.

Also, the electrical conductivity of this multilayer tube was measured according to SAE J-2260 and found to be $10^6 \Omega$ or less, revealing that the destatisizing performance was excellent.

Example 6

A multilayer tube having a layer structure shown in Table 1 was obtained in the same manner as in Example 1 except that in Example 1, the (B) semi-aromatic polyamide (B-1) was changed to (B-3). The physical properties of this multilayer tube were measured and the results obtained are shown in Table 1.

Example 7

A multilayer tube having a layer structure shown in Table 1 was obtained in the same manner as in Example 1 except that in Example 1, the (B) semi-aromatic polyamide (B-1) was changed to (B-4). The physical properties of this multilayer tube were measured and the results obtained are shown in Table 1.

Example 8

A multilayer tube having a layer structure shown in Table 1 was obtained in the same manner as in Example 7 except that in Example 7, the (D) terminal modified polyamide (D-1) was changed to (D-2). The physical properties of this multilayer tube were measured and the results obtained are shown in Table 1.

Example 9

A multilayer tube having a layer structure shown in Table 1 was obtained in the same manner as in Example 7 except that in Example 7, the (D) terminal modified polyamide (D-1) was changed to (D-3). The physical properties of this multilayer tube were measured and the results obtained are shown in Table 1.

Example 10

A multilayer tube having a layer structure shown in Table 1 was obtained in the same manner as in Example 2 except that in Example 2, the (D) terminal modified polyamide (D-1) was changed to (D-4). The physical properties of this multilayer tube were measured and the results obtained are shown in Table 1.

Example 11

A multilayer tube having a layer structure shown in Table 1 was obtained in the same manner as in Example 2 except that in Example 2, the (D) terminal modified polyamide (D-1) was not used. The physical properties of this multilayer tube were measured and the results obtained are shown in Table 1.

Example 12

The above-described (A) polyamide 12 resin composition (A-1), (B) semi-aromatic polyamide (B-2), (C) fluorine-containing polymers (C-1) and (C-5), and (D) terminal modified polyamide (D-1) were separately melted by using a five-layer tube forming machine, Plabor (manufactured by Plabor Co., Ltd.) at an extrusion temperature of 250° C. for (A), 300° C. for (B) and 280° C. for (C), and the discharged resin melts were joined by means of an adapter and processed into a multilayer tubular form. Subsequently, the processed article was cooled by a sizing die capable of controlling the dimension and withdrawn to obtain a multilayer tube having an inner diameter of 6 mm and an outer diameter of 8 mm and having a layer structure of (a)/(b)/(d)/(c)/(c')=0.60/0.15/0.10/0.05/0.10 mm consisting of a layer (a) comprising the (A) polyamide 12 resin composition (outermost layer), a layer (b) comprising the (B) semi-aromatic polyamide (outer layer), a layer (c) comprising the (C) fluorine-containing polymer (C-1) (inner layer), a layer (c') comprising the (C) fluorine-containing polymer (C-5) (innermost layer) and a layer (d) comprising the (D) terminal modified polyamide (intermediate layer). The physical properties of this multilayer tube were measured and the results obtained are shown in Table 1.

Example 13

A multilayer tube having a layer structure shown in Table 1 was obtained in the same manner as in Example 12 except that in Example 12, the (C) fluorine-containing polymer (C-5) disposed as an innermost layer was changed to the electrically conducting fluorine-containing polymer (C-6) and the (C-6) was melted at an extrusion temperature of 300° C. The physical properties of this multilayer tube were measured and the results obtained are shown in Table 1. Also, the electrical conductivity of this multilayer tube was measured according to SAE J-2260 and found to be $10^6 \Omega$ or less, revealing that the destatisizing performance was excellent.

Example 14

The above-described (A) polyamide 12 resin composition (A-1), (B) semi-aromatic polyamide (B-2) and (C) fluorine-containing polymers (C-1), (C-5) and (C-6) were separately melted by using a five-layer tube forming machine, Plabor, (manufactured by Plabor Co., Ltd.) at an extrusion temperature of 250° C. for (A), 300° C. for (B), 280° C. for (C-1) and (C-5) and 300° C. for (C-6), and the discharged resin melts were joined by means of an adapter and processed into a multilayer tubular form. Subsequently, the processed article was cooled by a sizing die capable of controlling the dimension and withdrawn to obtain a multilayer tube having an inner diameter of 6 mm and an outer diameter of 8 mm and having a layer structure of (a)/(b)/(c)/(c')/(c")=0.70/0.15/0.05/0.05/0.05 mm consisting of a layer (a) comprising the (A) polyamide 12 resin composition (outermost layer), a layer (b) comprising the (B) semi-aromatic polyamide (outer layer), a layer (c) comprising the (C) fluorine-containing polymer (C-1) (intermediate layer), a layer (c') comprising the (C) fluorine-containing polymer (C-5) (inner layer) and a layer (c") comprising the (C) electrically conducting fluorine-containing polymer (C-6) (innermost layer). The physical properties of this multilayer tube were measured and the results obtained are shown in Table 1. Also, the electrical conductivity of this multilayer tube was measured according to SAE J-2260 and found to be $10^6 \Omega$ or less, revealing that the destatisizing performance was excellent.

Comparative Example 1

A multilayer tube having a layer structure shown in Table 1 was obtained in the same manner as in Example 1 except that in Example 1, the (B) semi-aromatic polyamide (B-1), the (C) fluorine-containing polymer (C-1) and the (D) terminal modified polyamide (D-1) were not used. The physical properties of this multilayer tube were measured and the results obtained are shown in Table 1.

Comparative Example 2

A multilayer tube having a layer structure shown in Table 1 was obtained in the same manner as in Example 1 except that in Example 1, the (C) fluorine-containing polymer (C-1) was changed to (C-5). The physical properties of this multilayer tube were measured and the results obtained are shown in Table 1.

Comparative Example 3

A multilayer tube having a layer structure shown in Table 1 was obtained in the same manner as in Example 1 except that in Example 1, the (B) semi-aromatic polyamide (B-1) was changed to (B-5) and the (B) was melted at an extrusion temperature of 280° C. The physical properties of this multilayer tube were measured and the results obtained are shown in Table 1.

Comparative Example 4

A multilayer tube having a layer structure shown in Table 1 was obtained in the same manner as in Example 1 except that in Example 1, the (C) fluorine-containing polymer (C-1) disposed as an innermost layer was changed to the (A) polyamide 12 resin composition (A-1). The physical properties of this multilayer tube were measured and the results obtained are shown in Table 1.

Comparative Example 5

The above-described (A) polyamide 12 resin composition (A-1), (B) semi-aromatic polyamide (B-5), (C) fluorine-containing polymer (C-1) and (H) adhesive resin (H-1) were separately melted by using a four-layer tube forming machine, Plabor (manufactured by Plabor Co., Ltd.) at an extrusion temperature of 250° C. for (A), 280° C. for (B) and 290° C. for (C), and the discharged resin melts were joined by means of an adapter and processed into a multilayer tubular form. Subsequently, the processed article was cooled by a sizing die capable of controlling the dimension and withdrawn to obtain a multilayer tube having an inner diameter of 6 mm and an outer diameter of 8 mm and having a layer structure of (a)/(h)/(b)/(c)=0.60/0.10/0.15/0.15 mm consisting of a layer (a) comprising the (A) polyamide 12 resin composition (outermost layer), a layer (b) comprising the (B) semi-aromatic polyamide (intermediate layer), a layer (c) comprising the (C) fluorine-containing polymer (innermost layer) and a layer (h) comprising the (H) adhesive resin (outer layer). The physical properties of this multilayer tube were measured and the results obtained are shown in Table 1.

Comparative Example 6

A multilayer tube having a layer structure shown in Table 1 was obtained in the same manner as in Comparative Example 5 except that in Comparative Example 5, the (B) semi-aromatic polyamide (B-5) was changed to the (E) ethylene/vinyl acetate copolymer saponification product (EVOH) (E-1), the (C) fluorine-containing polymer (C-1) was changed to (C-3), the (C) was melted at an extrusion temperature of 230° C., and the (E) was melted at an extrusion temperature 230° C. The physical properties of this multilayer tube were measured and the results obtained are shown in Table 1.

Comparative Example 7

The above-described (A) polyamide 12 resin composition (A-1), (C) fluorine-containing polymer (C-5), (F) polybutylene naphthalate (PBN) (F-1), and (H) adhesive resins (H-2) and (H-3) were separately melted by using a five-layer tube forming machine, Plabor (manufactured by Plabor Co., Ltd.) at an extrusion temperature of 250° C. for (A), 290° C. for (C), 260° C. for (F) and 280° C. for (H), and the discharged resin melts were joined by means of an adapter and processed into a multilayer tubular form. Subsequently, the processed article was cooled by a sizing die capable of controlling the dimension and withdrawn to obtain a multilayer tube having an inner diameter of 6 mm and an outer diameter of 8 mm and having a layer structure of (a)/(h)/(f)/(h')/(c)=0.55/0.10/0.10/0.10/0.15 mm consisting of a layer (a) comprising the (A) polyamide 12 resin composition (outermost layer), a layer (f) comprising the (F) polybutylene naphthalate (PBN) (intermediate layer), a layer (c) comprising the (C) fluorine-containing polymer (innermost layer), a layer (h) comprising the (H) adhesive resin (H-2) (outer layer) and a layer (h') comprising the (H) adhesive resin (H-3) (inner layer). The physical properties of this multilayer tube were measured and the results obtained are shown in Table 1.

Comparative Example 8

A multilayer tube having a layer structure shown in Table 1 was obtained in the same manner as in Comparative Example 7 except that in Comparative Example 7, the (F) polybutylene naphthalate (PBN) (F-1) was changed to the (G) polyphenylene sulfide (PPS), the (H) adhesive resins (H-2) and (H-3) to (H-4) and (H-5), the (F) was melted at an extrusion temperature of 300° C., and the (H) was melted at an extrusion temperature of 280° C. The physical properties of this multilayer tube were measured and the results obtained are shown in Table 1.

TABLE 1

| | Outermost Layer | | Outer Layer | | Intermediate Layer | | Inner Layer | | Innermost Layer | |
|---|---|---|---|---|---|---|---|---|---|---|
| | Kind | Thickness [mm] | Kind | Thickness [mm] | Kind | Thickness [mm] | Kind | Thickness [mm] | Kind | Thickness [mm] |
| Example 1 | A-1 | 0.60 | — | — | B-1 | 0.15 | D-1 | 0.10 | C-1 | 0.15 |
| Example 2 | A-1 | 0.60 | — | — | B-2 | 0.15 | D-1 | 0.10 | C-1 | 0.15 |
| Example 3 | A-1 | 0.60 | — | — | B-2 | 0.15 | D-1 | 0.10 | C-2 | 0.15 |
| Example 4 | A-1 | 0.60 | — | — | B-2 | 0.15 | D-1 | 0.10 | C-3 | 0.15 |
| Example 5 | A-1 | 0.60 | — | — | B-2 | 0.15 | D-1 | 0.10 | C-4 | 0.15 |
| Example 6 | A-1 | 0.60 | — | — | B-3 | 0.15 | D-1 | 0.10 | C-1 | 0.15 |
| Example 7 | A-1 | 0.60 | — | — | B-4 | 0.15 | D-1 | 0.10 | C-1 | 0.15 |
| Example 8 | A-1 | 0.60 | — | — | B-2 | 0.15 | D-2 | 0.10 | C-1 | 0.15 |
| Example 9 | A-1 | 0.60 | — | — | B-4 | 0.15 | D-3 | 0.10 | C-1 | 0.15 |
| Example 10 | A-1 | 0.60 | — | — | B-2 | 0.15 | D-4 | 0.10 | C-1 | 0.15 |
| Example 11 | A-1 | 0.70 | — | — | B-2 | 0.15 | — | — | C-1 | 0.15 |
| Example 12 | A-1 | 0.60 | B-2 | 0.15 | D-1 | 0.10 | C-1 | 0.05 | C-5 | 0.10 |
| Example 13 | A-1 | 0.60 | B-2 | 0.15 | D-1 | 0.10 | C-1 | 0.05 | C-6 | 0.10 |
| Example 14 | A-1 | 0.70 | B-2 | 0.15 | C-1 | 0.05 | C-5 | 0.05 | C-6 | 0.05 |
| Comparative Example 1 | A-1 | 1.00 | — | — | — | — | — | — | — | — |
| Comparative Example 2 | A-1 | 0.60 | — | — | B-1 | 0.15 | D-1 | 0.10 | C-5 | 0.15 |
| Comparative Example 3 | A-1 | 0.60 | — | — | B-5 | 0.15 | D-1 | 0.10 | C-1 | 0.15 |
| Comparative Example 4 | A-1 | 0.60 | — | — | B-1 | 0.15 | D-1 | 0.10 | A-1 | 0.15 |
| Comparative Example 5 | A-1 | 0.60 | H-1 | 0.10 | B-5 | 0.15 | — | — | C-1 | 0.15 |
| Comparative Example 6 | A-1 | 0.60 | H-1 | 0.10 | E-1 | 0.15 | — | — | C-3 | 0.15 |
| Comparative Example 7 | A-1 | 0.55 | H-2 | 0.10 | F-1 | 0.10 | H-3 | 0.10 | C-5 | 0.15 |
| Comparative Example 8 | A-1 | 0.55 | H-4 | 0.10 | G-1 | 0.10 | H-5 | 0.10 | C-5 | 0.15 |

| | Low-Temperature Impact Resistance [number of ruptured tubes/number of tested tubes] | Fuel Permeation Coefficient [g/m$^2$ · day] | Interlayer Adhesion [N/cm] | | Sour Gasoline Resistance [number of ruptured tubes/number of tested tubes] | Heat Resistance [number of ruptured tubes/number of tested tubes] |
|---|---|---|---|---|---|---|
| | | | Initial | After Immersion in Fuel for 1,000 hours | | |
| Example 1 | 0/10 | 11.0 | 49 | 25 | 0/10 | 0/10 |
| Example 2 | 0/10 | 4.5 | 45 | 24 | 0/10 | 0/10 |
| Example 3 | 0/10 | 5.0 | 46 | 27 | 0/10 | 0/10 |
| Example 4 | 0/10 | 5.5 | 48 | 29 | 0/10 | 0/10 |
| Example 5 | 0/10 | 4.0 | 47 | 20 | 0/10 | 0/10 |
| Example 6 | 0/10 | 13.0 | unseparable | 38 | 0/10 | 0/10 |
| Example 7 | 0/10 | 6.0 | unseparable | 38 | 0/10 | 0/10 |
| Example 8 | 0/10 | 4.0 | 45 | 23 | 0/10 | 0/10 |
| Example 9 | 0/10 | 4.5 | unseparable | 28 | 0/10 | 0/10 |
| Example 10 | 0/10 | 4.0 | 43 | 20 | 0/10 | 0/10 |
| Example 11 | 0/10 | 4.5 | 44 | 24 | 0/10 | 0/10 |
| Example 12 | 0/10 | 4.5 | 48 | 23 | 0/10 | 0/10 |
| Example 13 | 0/10 | 4.0 | 47 | 25 | 0/10 | 0/10 |

TABLE 1-continued

| | | | | | | |
|---|---|---|---|---|---|---|
| Example 14 | 0/10 | 4.0 | 43 | 24 | 0/10 | 0/10 |
| Comparative Example 1 | 0/10 | 180.0 | — | — | 0/10 | 0/10 |
| Comparative Example 2 | 0/10 | 10.5 | 4 | 0.2 | 0/10 | 0/10 |
| Comparative Example 3 | 5/10 | 13.0 | 3 | 0.5 | 7/10 | 6/10 |
| Comparative Example 4 | 0/10 | 34.0 | 46 | 21 | 2/10 | 0/10 |
| Comparative Example 5 | 6/10 | 14.0 | 43 | 14 | 7/10 | 6/10 |
| Comparative Example 6 | 2/10 | 9.0 | 35 | 18 | 5/10 | 10/10 |
| Comparative Example 7 | 4/10 | 4.0 | 14 | 3 | 4/10 | 3/10 |
| Comparative Example 8 | 3/10 | 3.0 | 15 | 4 | 3/10 | 2/10 |

INDUSTRIAL APPLICABILITY

Our multilayer tubes are applicable to various uses including automobile parts, internal combustion applications, machine parts such as power tool housings, as well as engineering materials, industrial materials, electric and electronic parts, medical services, food products, household articles, office supplies, building material parts and furniture components.

Also, the multilayer tubes are suitable for chemical fluid-transporting piping. Examples of the chemical fluid include gasoline, kerosine, diesel gasoline, methanol, ethanol, propanol, butanol, alcohol-containing gasoline, methyl-tert-butyl ether, oxygen-containing gasoline, amine-containing gasoline, sour gasoline, castor oil-based brake fluid, glycol ether-type brake fluid, boric acid ester-type brake fluid, brake fluid for very cold regions, silicone oil-type brake fluid, mineral oil-type brake fluid, power steering oil, window washer fluid, engine cooling fluid, medicine, ink and coating material. The multilayer tubes are suitable as tubes for transporting the above-mentioned chemical fluids, and specific examples of the tubes include a fuel tube such as a feed tube, a return tube, an evaporation tube, a fuel filler tube, an ORVR tube, a reserve tube and a vent tube, an oil tube, a break tube, a window washer fluid tube, a radiator tube, a cooler tube for cooling water, a cooling medium or the like, a cooling medium tube for an air conditioner, a tube for floor heating, a tube for a fire extinguisher or fire extinguishing equipment, a tube for medical cooling equipment, a tube for spraying ink or coating material, and a tube for other chemical fluids.

In particular, the multilayer tubes have excellent alcohol gasoline permeation-preventing property and is suitable as a fuel tube. Furthermore, the multilayer tubes have excellent heat resistance and are useful also as a tube for transporting a high-temperature chemical fluid or gas.

Accordingly, the multilayer tubes are applicable in any environment which requires high reliability and has a very great utility value in industry.

The invention claimed is:

1. A multilayer tube comprising at least three layers including:
   a layer (a) comprising (A) polyamide 11 and/or polyamide 12,
   a layer (b) consisting of (B) a semi-aromatic polyamide or a combination of a
   semi-aromatic polyamide and an additive selected from the group consisting of an antioxidant, a heat stabilizer, an ultraviolet absorbent, a light stabilizer, a lubricant, an inorganic filler, an antistatic agent, a flame retardant, a crystallization accelerator, a plasticizer, a colorant, a lubricating agent and an impact resistance improver, said semi-aromatic polyamide (B) consisting of a dicarboxylic acid unit containing a terephthalic acid and/or naphthalenedicarboxylic acid unit in a proportion of about 50 mol % or more based on all dicarboxylic acid units, and a diamine unit containing a 1,9-nonane-diamine and/or 2-methyl-1,8-octanediamine unit in a proportion of about 60 mol % or more based on all diamine units and
   a layer (c) comprising (C) a fluorine-containing polymer having introduced into the molecular chain thereof at least one functional group selected from the group consisting of a carboxy group, an acid anhydride group, a carboxylate group, an alkoxycarbonyl group, a hydroxyl group, a sulfo group, a sulfonate group, an epoxy group, a cyano group, a carbonate group and a carboxylic acid halide group, as said functional group having reactivity with the polyamide-based resin, and
   wherein said layer (b) comprising (B) the semi-aromatic polyamide is disposed between said layer (a) comprising (A) polyamide 11 and/or polyamide 12 and said layer (c) comprising (C) a fluorine-containing polymer.

2. The multilayer tube as claimed in claim 1, wherein said layer (a) comprising (A) polyamide 11 and/or polyamide 12 is disposed as an outermost layer.

3. The multilayer tube as claimed in claim 1, wherein said (C) fluorine-containing polymer having introduced into the molecular chain thereof a functional group having reactivity with a polyamide-based resin is based on at least one fluorine-containing polymer selected from the group consisting of an ethylene/tetrafluoroethylene copolymer, a polyvinyl idene fluoride, and a tetrafluoroethylene/hexafluoropropylene/vinylidene fluoride copolymer.

4. The multilayer tube as claimed in claim 1, wherein an electrically conducting layer comprising a fluorine-containing polymer composition having incorporated thereinto an electrically conducting filler is disposed as an innermost layer in the multilayer tube.

5. The multilayer tube as claimed in claim 1, which is a fuel tube.

6. The multilayer tube according to claim 1, wherein said fluorine-containing polymer has an acid anhydride group as said functional group having reactivity with a polyamide-based resin.

7. The multilayer tube according to claim 1, wherein said functional group of said layer (c) is itaconic acid anhydride.

8. A multilayer tube comprising at least four layers including:
- a layer (a) comprising (A) polyamide 11 and/or polyamide 12,
- a layer (b) comprising (B) a semi-aromatic polyamide consisting of a dicarboxylic acid unit containing a terephthalic acid and/or naphthalene-dicarboxylic acid unit in a proportion of about 50 mol % or more based on all dicarboxylic acid units, and a diamine unit containing a 1,9-nonanediamine and/or 2-methyl-1,8-octanediamine unit in a proportion of about 60 mol % or more based on all diamine units,
- a layer (c) comprising (C) a fluorine-containing polymer having introduced into the molecular chain thereof a functional group having reactivity with a polyamide-based resin, and
- a layer (d) consisting of (D) a terminal modified polyamide and optionally an additive selected from the group consisting of an antioxidant, a heat stabilizer, an ultraviolet absorbent, a light stabilizer, a lubricant, an inorganic filler, an antistatic agent, a flame retardant, a crystallization accelerator and an impact resistance improver, said terminal modified polyamide satisfying [A]>[B]+5, wherein [A] is the terminal amino group concentration (μeq/g-polymer) of the polyamide and [B] is the terminal carboxyl group concentration (μeq/g-polymer) of the polyamide,
- wherein said layer (b) comprising (B) the semi-aromatic polyamide is disposed between said layer (a) comprising (A) polyamide 11 and/or polyamide 12 and said layer (c) comprising (C) the fluorine-containing polymer, and said layer (d) comprising (D) the terminal modified polyamide is disposed between said layer (b) comprising (B) the semi-aromatic polyamide and said layer (c) comprising (C) the fluorine-containing polymer, and
- wherein each of said layers (a), (b), (c) and (d) is a coextrusion molded article.

9. The multilayer tube as claimed in claim 8, wherein said layer (a) comprising (A) polyamide 11 and/or polyamide 12 is disposed as an outermost layer.

10. The multilayer tube as claimed in claim 8, wherein said (C) fluorine-containing polymer having introduced into the molecular chain thereof a functional group having reactivity with a polyamide-based resin is based on at least one fluorine-containing polymer selected from the group consisting of an ethylene/tetrafluoroethylene copolymer, a polyvinylidene fluoride, and a tetrafluoroethylene/hexafluoropropylene/vinylidene fluoride copolymer.

11. The multilayer tube as claimed in claim 8, wherein said (D) terminal modified polyamide is a polyamide produced by adding a diamine at the polymerization.

12. The multilayer tube as claimed in claim 8, wherein an electrically conducting layer comprising a fluorine-containing polymer composition having incorporated thereinto an electrically conducting filler is disposed as an innermost layer in the multilayer tube.

13. The multilayer tube as claimed in claim 8, which is a fuel tube.

14. The multilayer tube according to claim 8, wherein said fluorine-containing polymer has at least one functional group selected from the group consisting of a carboxyl group, an acid anhydride group, a carboxylate group, an alkoxycarbonyl group, a hydroxyl group, a sulfo group, a sulfonate group, an epoxy group, a cyano group, a carbonate group and a carboxylic acid halide group, as said functional group having reactivity with the polyamide-based resin.

15. The multilayer tube according to claim 8, wherein said fluorine-containing polymer has an acid anhydride group as said functional group having reactivity with a polyamide-based resin.

16. The multilayer tube according to claim 8, wherein said functional group of layer (c) is itaconic acid anhydride.

* * * * *